(12) United States Patent
Choi et al.

(10) Patent No.: US 8,688,305 B2
(45) Date of Patent: **\*Apr. 1, 2014**

(54) SYSTEM FOR MANAGING VEHICLE ENERGY, AND METHOD AND APPARATUS FOR SAME

(71) Applicant: SK Planet Co., Ltd., Seoul (KR)

(72) Inventors: Yoon Jeong Choi, Seoul (KR); Dae Lim Son, Seoul (KR); Eun Bok Lee, Seoul (KR); Jun Yong Jung, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/910,480

(22) Filed: Aug. 5, 2013

(65) Prior Publication Data

US 2013/0311404 A1 Nov. 21, 2013

Related U.S. Application Data

(63) Continuation of application No. 13/989,389, filed as application No. PCT/KR2012/003098 on Apr. 20, 2012.

(30) Foreign Application Priority Data

Jul. 25, 2011 (KR) .......................... 10-2011-0073348
Aug. 30, 2011 (KR) .......................... 10-2011-0086821
Aug. 31, 2011 (KR) .......................... 10-2011-0087603

(51) Int. Cl.
*G06F 7/00* (2006.01)
*B60W 10/06* (2006.01)
*B60W 10/08* (2006.01)
*B60W 20/00* (2006.01)

(52) U.S. Cl.
CPC ............... *B60W 10/06* (2013.01); *B60W 10/08* (2013.01); *B60W 20/00* (2013.01); *B60W 2510/244* (2013.01); *Y02T 10/6286* (2013.01)
USPC ..................... 701/22; 180/65.265; 180/65.21; 180/65.28; 180/65.31; 713/300; 713/320; 713/321; 713/323; 327/143; 327/205; 327/545

(58) Field of Classification Search
CPC ..... B60W 10/06; B60W 10/08; B60W 20/00; B60W 2510/244; Y02T 10/6286
USPC .................... 702/22; 713/300, 320, 321, 323; 327/143, 33, 545, 205; 365/189.05, 365/226, 149; 375/130, 139, 142, 146, 150; 714/14, 22; 380/34; 455/522; 180/65.265, 65.28, 65.21, 65.31
See application file for complete search history.

(56) References Cited

U.S. PATENT DOCUMENTS 7,527,288 B2 * 5/2009 Breed .......................... 280/735
7,672,756 B2 * 3/2010 Breed .............................. 701/1

(Continued)

FOREIGN PATENT DOCUMENTS

JP 2007312581 11/2007
JP 2011120327 6/2011

(Continued)

OTHER PUBLICATIONS

International Search Report mailed Dec. 3, 2012 for PCT/KR2012/003098.

*Primary Examiner* — McDieunel Marc
(74) *Attorney, Agent, or Firm* — Lowe Hauptman & Ham, LLP

(57) ABSTRACT

In a method, system and apparatus for managing vehicle energy, the amount of electric power needed for operating a vehicle is calculated, a surplus amount of electric power that is the current amount of battery power less the calculated amount of electric power is sold, or a number of received location information signals according to the current amount of battery power is adjusted.

12 Claims, 15 Drawing Sheets

(56) References Cited

U.S. PATENT DOCUMENTS

| | | | |
|---|---|---|---|
| 7,920,102 B2* | 4/2011 | Breed | 345/7 |
| 2006/0212194 A1* | 9/2006 | Breed | 701/29 |
| 2006/0284839 A1* | 12/2006 | Breed et al. | 345/156 |
| 2007/0057781 A1* | 3/2007 | Breed | 340/457.1 |
| 2007/0075919 A1* | 4/2007 | Breed | 345/8 |
| 2008/0086240 A1* | 4/2008 | Breed | 701/1 |
| 2008/0091309 A1* | 4/2008 | Walker | 701/1 |
| 2009/0139781 A1* | 6/2009 | Straubel | 180/65.1 |
| 2010/0228405 A1* | 9/2010 | Morgal et al. | 701/2 |
| 2011/0137489 A1* | 6/2011 | Gilleland et al. | 701/2 |
| 2013/0253746 A1* | 9/2013 | Choi et al. | 701/22 |

FOREIGN PATENT DOCUMENTS

| | | |
|---|---|---|
| JP | 2011128871 | 6/2011 |
| KR | 1020110040220 | 4/2011 |

* cited by examiner

SYSTEM FOR MANAGING VEHICLE ENERGY, AND METHOD AND APPARATUS FOR SAME

CROSS REFERENCE TO RELATED APPLICATION

The present application is a Continuation Application of U.S. application Ser. No. 13/989,389, filed on May 23, 2013, which is a National Phase application of International Application Number PCT/KR2012/003098 filed on Apr. 20, 2012, the disclosure of which is hereby incorporated by reference herein in their entirety. Further, this application claims the priorities of Korean Patent Application No. 10-2011-0073348, filed on Jul. 25, 2011; No. 10-2011-0086821, filed on Aug. 30, 2011; and No. 10-2011-0087603, filed on Aug. 31, 2011 in the KIPO (Korean Intellectual Property Office), the disclosure of which are incorporated herein in their entirety by reference.

TECHNICAL FIELD

The present invention relates to vehicle energy management technology and, more particularly, to a vehicle energy management system, method and apparatus for calculating electric power required for vehicle operation, selling surplus electric power that corresponds to current battery power minus the calculated electric power, or adjusting the number of times to receive location information signals according to the current battery power.

BACKGROUND ART

Vehicles have become a representative means of transport in the life of today. Additionally, the advent of low-priced and various kinds of vehicles may cause an increase in the number of vehicles per household.

Especially, according to a recent worldwide trend toward energy conservation and environment regulation, the market of eco-friendly electric vehicle (EV) is making a rapid and strong growth. In U.S.A. and Europe, the propagation of electric vehicles has been made compulsory, and in Korea, interest and development in eco-friendly green cars are showing a steady growth.

However, a great part of power needed to drive electric vehicles still relies upon thermal power generation. In case where electric power produced by means of thermal power generation is used as a power source of electric vehicles, $CO_2$ emission is actually greater due to thermal power generation and efficiency of vehicles is still lower than in case of fossil fuel-powered vehicles.

Thus, a technique to effectively manage electric power required for operating electric vehicles in view of energy efficiency as well as environment is needed.

DETAILED DESCRIPTION OF THE INVENTION

Technical Problems

Accordingly, one aspect of the present invention is to provide a vehicle energy management system, method and apparatus that can effectively utilize electric power stored in a vehicle by calculating electric power required for vehicle operation and then selling surplus electric power that corresponds to current battery power minus the calculated electric power.

Another aspect of the present invention is to provide a vehicle energy management system, method and apparatus that can calculate electric power required for vehicle operation on the basis of vehicle operation pattern or in view of weather information and thereby sell surplus electric power that corresponds to current battery power minus the calculated electric power.

Still another aspect of the present invention is to provide a vehicle energy management system, method and apparatus that can reduce energy consumption caused in a process of receiving location information signals by consuming vehicle power.

Technical Solutions

One aspect of the present invention provides a vehicle energy management system that includes a vehicle management apparatus configured to calculate operation pattern of a vehicle on the basis of vehicle operation data in given periods, to calculate electric power required for vehicle operation on the basis of the operation pattern, to transmit an electric power transaction request to a service apparatus, the electric power transaction request including information about surplus electric power that corresponds to current battery power minus the electric power required for vehicle operation, and if electric power transaction information is received from the service apparatus, to sell the surplus electric power according to the electric power transaction information; and the service apparatus configured to monitor information about power rates and power demand, if the electric power transaction request is received from the vehicle management apparatus, to create the electric power transaction information for selling the surplus electric power on optimal condition in view of the information about power rates and power demand, and to transmit the electric power transaction information to the vehicle management apparatus.

Another aspect of the present invention provides a vehicle energy management system that includes a vehicle management apparatus configured to receive weather information from a service apparatus, to calculate electric power required for vehicle operation on the basis of the weather information, to transmit an electric power transaction request to the service apparatus, the electric power transaction request including information about surplus electric power that corresponds to current battery power minus the electric power required for vehicle operation, and if electric power transaction information is received from the service apparatus, to sell the surplus electric power according to the electric power transaction information; and the service apparatus configured to receive the weather information from at least one weather information provider, to monitor information about power rates and power demand, if the electric power transaction request is received from the vehicle management apparatus, to create the electric power transaction information for selling the surplus electric power on optimal condition in view of the information about power rates and power demand, and to transmit the electric power transaction information to the vehicle management apparatus.

Still another aspect of the present invention provides a vehicle energy management system that includes a vehicle management apparatus configured to create current battery power information by checking current battery power, to check the number of times to receive location information signals, to transmit the current battery power information and the number of times to receive to a service apparatus, and if the adjusted number of times to receive location information signals is received from the service apparatus, to receive the location information signals according to the adjusted number of times; and the service apparatus configured to compare the current battery power with a predetermined threshold when the current battery power information and the number of times are received from the vehicle management apparatus, to adjust the number of times depending on comparison results, and to transmit the adjusted number of times to the vehicle management apparatus.

Yet another aspect of the present invention provides a vehicle energy management system that includes a vehicle management apparatus configured to create vehicle operation data by monitoring a state of a vehicle, to create current battery power information by checking current battery power, and to provide the vehicle operation data and the current battery power information to a terminal; the terminal configured to calculate operation pattern information by analyzing the vehicle operation data in given periods, to calculate electric power required for vehicle operation on the basis of the operation pattern, to transmit an electric power transaction request to a service apparatus, the electric power transaction request including information about surplus electric power that corresponds to current battery power minus the electric power required for vehicle operation, and if electric power transaction information is received from the service apparatus, to transmit a control command to the vehicle management apparatus to sell the surplus electric power according to the electric power transaction information; and the service apparatus configured to monitor information about power rates and power demand, if the electric power transaction request is received from the terminal, to create the electric power transaction information for selling the surplus electric power on optimal condition in view of the information about power rates and power demand, and to transmit the electric power transaction information to the terminal.

Yet another aspect of the present invention provides a vehicle energy management system that includes a vehicle management apparatus configured to monitor a state of a vehicle, to create current battery power information by checking current battery power, and to provide the current battery power information to a terminal; the terminal configured to receive weather information from a service apparatus, to calculate electric power required for vehicle operation on the basis of the weather information, to transmit an electric power transaction request to the service apparatus, the electric power transaction request including information about surplus electric power that corresponds to current battery power minus the electric power required for vehicle operation, and if electric power transaction information is received from the service apparatus, to transmit a control command to the vehicle management apparatus to sell the surplus electric power according to the electric power transaction information; and the service apparatus configured to provide the weather information to the terminal, to monitor information about power rates and power demand, if the electric power transaction request is received from the terminal, to create the electric power transaction information for selling the surplus electric power on optimal condition in view of the information about power rates and power demand, and to transmit the electric power transaction information to the terminal.

Yet another aspect of the present invention provides a vehicle energy management system that includes a vehicle management apparatus configured to monitor a state of a vehicle, to create current battery power information by checking current battery power, and to provide the current battery power information to a terminal; a terminal configured to check the number of times to receive location information signals, to transmit to a service apparatus the current battery power information and the number of times to receive location information signals, and if the adjusted number of times to receive location information signals is received from the service apparatus, to receive the location information signals according to the adjusted number of times; and the service apparatus configured to compare the current battery power with a predetermined threshold when the current battery power information and the number of times are received from the terminal, to adjust the number of times depending on comparison results, and to transmit the adjusted number of times to the terminal.

Yet another aspect of the present invention provides a vehicle management apparatus that includes a communication unit configured to transmit an electric power transaction request to a service apparatus, and to receive electric power transaction information from the service apparatus; and a control unit configured to calculate operation pattern of a vehicle on the basis of vehicle operation data in given periods, to calculate electric power required for vehicle operation on the basis of the operation pattern, to transmit the electric power transaction request to the service apparatus, the electric power transaction request including information about surplus electric power that corresponds to current battery power minus the electric power required for vehicle operation, and if the electric power transaction information is received from the service apparatus, to sell the surplus electric power according to the electric power transaction information.

In the vehicle management apparatus, the operation pattern information may be one of mileage and speed which are analyzed per a given period.

Yet another aspect of the present invention provides a vehicle management apparatus that includes a communication unit configured to transmit an electric power transaction request to a service apparatus, and to receive weather information and electric power transaction information from the service apparatus; and a control unit configured to receive weather information from the service apparatus, to calculate electric power required for vehicle operation on the basis of the weather information, to transmit the electric power transaction request to the service apparatus, the electric power transaction request including information about surplus electric power that corresponds to current battery power minus the electric power required for vehicle operation, and if the electric power transaction information is received from the service apparatus, to sell the surplus electric power according to the electric power transaction information.

In the vehicle management apparatus, the weather information may include factors that indicate atmospheric conditions including at least one of temperature, pressure, humidity, wind direction, wind speed, and rainfall.

In the vehicle management apparatus, the control unit may be further configured to, if the current battery power is insufficient for vehicle operation, calculate a shortage of electric power, to transmit an electric power transaction request including information about the shortage of electric power to the service apparatus, and if the electric power transaction information is received from the service apparatus, to purchases the shortage of electric power according to the electric power transaction information.

In the vehicle management apparatus, the control unit may be further configured to, if electric power transaction information that includes a time point of sales for selling the surplus electric power on optimal condition and location information about a place available for sales is received from the service apparatus, to output at least one of a transit path, a departure time and a transit time.

Yet another aspect of the present invention provides a vehicle management apparatus that includes a GPS receiver configured to receive location information signals according to the predetermined number of times; and a control unit configured to create current battery power information by checking current battery power, to compare the current battery power with a predetermined threshold, to adjust the number of times depending on comparison results, and to control the GPS receiver to receive the location information signals according to the adjusted number of times.

In the vehicle management apparatus, the control unit may be further configured to, if the current battery power is lower than the predetermined threshold, decrease the number of times to receive the location information signals.

In the vehicle management apparatus, the control unit may be further configured to, if the current battery power is equal to or greater than the predetermined threshold, maintain or increase the number of times to receive the location information signals.

In the vehicle management apparatus, the control unit may be further configured to, while the number of times to receive location information signals is adjusted, periodically check the current battery power, and to compare again the current battery power with the predetermined threshold.

Yet another aspect of the present invention provides a terminal that includes a terminal communication unit configured to communicate with a vehicle management apparatus and a service apparatus; and a terminal control unit configured to, when vehicle operation data is received from the vehicle management apparatus, calculate operation pattern information by analyzing the vehicle operation data in given periods, to calculate electric power required for vehicle operation on the basis of the operation pattern, to transmit an electric power transaction request to a service apparatus, the electric power transaction request including information about surplus electric power that corresponds to current battery power minus the electric power required for vehicle operation, and if electric power transaction information is received from the service apparatus, to transmit a control command to the vehicle management apparatus to sell the surplus electric power according to the electric power transaction information.

Yet another aspect of the present invention provides a terminal that includes a terminal communication unit configured to communicate with a vehicle management apparatus and a service apparatus; and a terminal control unit configured to receive current battery power information from the vehicle management apparatus, to receive weather information from a service apparatus, to calculate electric power required for vehicle operation on the basis of the weather information, to transmit an electric power transaction request to the service apparatus, the electric power transaction request including information about surplus electric power that corresponds to current battery power minus the electric power required for vehicle operation, and if electric power transaction information is received from the service apparatus, to transmit a control command to the vehicle management apparatus to sell the surplus electric power according to the electric power transaction information.

Yet another aspect of the present invention provides a terminal that includes a terminal communication unit configured to communicate with a vehicle management apparatus and a service apparatus; a GPS receiver configured to receive location information signals according to the predetermined number of times; and a terminal control unit configured to receive current battery power information from the vehicle management apparatus, to check the number of times to receive location information signals, to transmit to the service apparatus the current battery power information and the number of times, and if the adjusted number of times to receive location information signals is received from the service apparatus, to control the GPS receiver to receive the location information signals according to the adjusted number of times.

The terminal may further include a terminal storage unit configured to store the number of times to receive the location information signals.

Yet another aspect of the present invention provides a terminal that includes a terminal storage unit configured to store the number of times to receive location information signals, and to store a predetermined threshold; a GPS receiver configured to receive the location information signals according to the number of times; and a control unit configured to, when current battery power information is received from a vehicle management apparatus, compare the current battery power with the predetermined threshold, to adjust the number of times depending on comparison results, and to control the GPS receiver to receive the location information signals according to the adjusted number of times.

Yet another aspect of the present invention provides a service apparatus that includes a power monitoring unit configured to monitor information about power rates and power demand; and a service control unit configured to, when an electric power transaction request is received from a vehicle management apparatus or a terminal, create electric power transaction information for selling electric power on optimal condition by considering the information about power rates and power demand, and to transmit the electric power transaction information to the vehicle management apparatus or the terminal.

In the service apparatus, the service control unit may be further configured to, when the electric power transaction request is received from the vehicle management apparatus or the terminal, perform user authentication for a vehicle, and in response to a success in authentication, to create the electric power transaction information.

In the service apparatus, the service control unit may be further configured to, if the electric power transaction request contains information about surplus electric power, transmit electric power transaction information for selling the surplus electric power on optimal condition to the vehicle management apparatus, and if the electric power transaction request contains information about a shortage of electric power, transmit electric power transaction information for purchasing the shortage of electric power at the lowest price to the vehicle management apparatus.

In the service apparatus, the service control unit may be further configured to, if a notice of electric power transaction completion is received from the vehicle management apparatus or the terminal, determine accounting data by calculating electric power transaction volume of the vehicle management apparatus or the terminal, and to, based on the accounting data, pay a sale value to a user, request a purchase value from the user, or accumulate the sale or purchase value.

In the service apparatus, the service control unit may be further configured to, if a power supply request is received, deliver the received power supply request to the vehicle management apparatus or the terminal.

The service apparatus may further include a service communication unit configured to communicate with the vehicle management apparatus or the terminal, and to transmit weather information to the vehicle management apparatus or the terminal.

Yet another aspect of the present invention provides a service apparatus that includes a service communication unit configured to communicate with at least one vehicle management apparatus or a terminal; and a service control unit configured to compare current battery power with a predetermined threshold when current battery power information and the number of times to receive location information signals are received from the vehicle management apparatus of the terminal, to adjust the number of times depending on comparison results, and to transmit the adjusted number of times to the vehicle management apparatus or the terminal.

Yet another aspect of the present invention provides a vehicle energy management method that includes steps of: at a vehicle management apparatus, checking current battery power; at the vehicle management apparatus, comparing the current battery power with electric power required for vehicle operation; at the vehicle management apparatus, if the current battery power exceeds the required electric power, calculating surplus electric power and thereby creating surplus electric power information, or if the current battery power is less than the required electric power, calculating a shortage of electric power and thereby creating electric power shortage information; and at the vehicle management apparatus, if electric power transaction information is received from a service apparatus after transmitting, to the service apparatus, an electric power transaction request including the surplus electric power information or the electric power shortage information, selling the surplus electric power or purchasing the shortage of electric power.

The method may further include steps of: before the step of comparing, at the vehicle management apparatus, creating operation pattern of a vehicle on the basis of vehicle operation data in given periods; and at the vehicle management apparatus, calculating electric power required for vehicle operation on the basis of the operation pattern.

The method may further include steps of: before the step of comparing, at the vehicle management apparatus, receiving weather information from the service apparatus; and at the vehicle management apparatus, calculating electric power required for vehicle operation on the basis of the weather information.

In the method, the electric power transaction information may include a time point of sales for selling the surplus electric power on optimal condition or a time point of purchase for buying the shortage of electric power at the minimum price, and location information about a place available for sales or purchase.

Yet another aspect of the present invention provides a vehicle energy management method that includes steps of: at a service apparatus, monitoring information about power rates and power demand; at the service apparatus, receiving an electric power transaction request from a vehicle management apparatus or a terminal; and at the service apparatus, creating, in view of the information about power rates and power demand, electric power transaction information for selling surplus electric power on optimal condition or for purchasing a shortage of electric power at the lowest price, and then transmitting the electric power transaction information to the vehicle management apparatus or the terminal.

The method may further include steps of: after the step of transmitting, at the service apparatus, if a notice of electric power transaction completion is received from the vehicle management apparatus or the terminal, determining accounting data by calculating electric power transaction volume of the vehicle management apparatus or the terminal; and at the service apparatus, based on the accounting data, paying a sale value to a user, requesting a purchase value from the user, or accumulating the sale or purchase value.

The method may further include step of: at the service apparatus, if a power supply request is received from the vehicle management apparatus or the terminal, delivering the received power supply request to other vehicle management apparatus or other terminal.

Yet another aspect of the present invention provides a vehicle energy management method that includes steps of: at a vehicle management apparatus, checking current battery power; at the vehicle management apparatus, comparing the current battery power with a predetermined threshold; at the vehicle management apparatus, depending on comparison results, adjusting the number of times to receive location information signals; and at the vehicle management apparatus, receiving the location information signals according to the adjusted number of times.

Advantageous Effects

According to the present invention, by selling surplus electric power except necessary electric power for vehicle operation, electric power stored in a vehicle can be effectively utilized.

According to the present invention, after calculating necessary electric power for vehicle operation on the basis of vehicle operation pattern or in view of weather information, optimal sales time and location can be determined.

According to the present invention, by adjusting the number of times to receive location information signals according to the current battery power, unnecessary energy consumption can be prevented.

MODE FOR CARRYING OUT THE INVENTION

Figure 1:
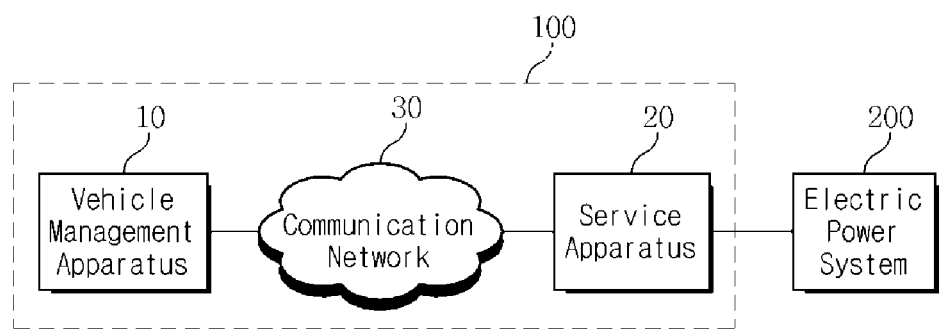
FIG. 1 is a schematic diagram illustrating a vehicle energy management system in accordance with an embodiment of the present invention.

Hereinafter, a preferred embodiment of the present invention will be described in detail with reference to the accompanying drawings. However, to avoid obscuring the subject matter of the present invention, well known functions or configurations will be omitted from the following descriptions and drawings. Further, the same elements will be designated by the same reference numerals although they are shown in different drawings.

FIG. 1 is a schematic diagram illustrating a vehicle energy management system in accordance with an embodiment of the present invention.

Referring to FIG. 1, the vehicle energy management system 100 includes a vehicle management apparatus 10, a service apparatus 20, and a communication network 30.

The vehicle management apparatus 10 is a device that manages the overall matters associated with electric power required for operating a vehicle. For example, the vehicle management apparatus 10 checks the current battery power, controls an inverter connected to the battery when electric power is supplied from the outside, stores electric power in the battery, or controls an outward supply of electric power stored in the battery at user's request.

Additionally, the vehicle management apparatus 10 may control information about the number of times to receive location information signals, depending on the current battery power.

Specifically, in the first embodiment of this invention, the vehicle management apparatus 10 calculates information about operation pattern of a vehicle on the basis of vehicle operation data in given periods, and calculates electric power required for vehicle operation on the basis of the operation pattern information. Furthermore, the vehicle management apparatus 10 transmits, to the service apparatus 20, an electric power transaction request including information about surplus electric power that corresponds to the current battery power minus the electric power required for vehicle operation. If electric power transaction information is received from the service apparatus 20, the vehicle management apparatus 10 controls an inverter to sell surplus electric power according to the electric power transaction information.

In the second embodiment of this invention, the vehicle management apparatus 10 receives weather information from the service apparatus 20, and calculates electric power required for vehicle operation on the basis of the weather information. Furthermore, the vehicle management apparatus 10 transmits, to the service apparatus 20, an electric power transaction request including information about surplus electric power that corresponds to the current battery power minus the electric power required for vehicle operation. If electric power transaction information is received from the service apparatus 20, the vehicle management apparatus 10 controls an inverter to sell surplus electric power according to the electric power transaction information.

In the third embodiment of this invention, the vehicle management apparatus 10 creates current battery power information by measuring the current batter power, checks the number of times to receive location information signals, and transmits to the service apparatus 20 the current battery power information and the number of times to receive location information signals. If the adjusted number of times to receive location information signals is received from the service apparatus 20, the vehicle management apparatus 10 receives location information signals according to the adjusted number of times to receive.

The service apparatus 20 is a device that supports a vehicle energy management service of this invention. The service apparatus 20 monitors information about power rates and power demand received from an electric power system 200. Additionally, if an electric power transaction request is received from at least one vehicle management apparatus 10, the service apparatus 20 creates electric power transaction information for selling electric power on optimal condition in view of information about power rates and power demand, and then transmits it to the vehicle management apparatus 10.

The electric power system 200 such as the power exchange is a system that collects and administers information about power rates and power demand.

Additionally, the service apparatus 20 compares the current battery power with a predetermined threshold when the current battery power information and the number of times to receive location information signals are received from the vehicle management apparatus 10. Then, depending on comparison results, the service apparatus 20 adjusts the number of times to receive location information signals and transmits the adjusted number to the vehicle management apparatus 10.

The vehicle management apparatus 10 and the service apparatus 20 communicate with each other through the communication network 30. The communication network 30 may employ various communication networks, for example, wireless networks such as WLAN (wireless LAN), Wi-Fi, Wibro, Wimax, or HSDPA (high speed downlink packet access). However, wired networks such as Ethernet, xDSL (i.e., ADSL or VDSL), HFC (hybrid fiber coaxial), FTTC (fiber to the curb), or FTTH (fiber to the home) may be alternatively or additionally employed.

Besides, any other well known networks or further networks under development or investigation may be adopted as the communication network 30.

Hereinbefore, a vehicle energy management system according to an embodiment of the invention has been described with reference to FIG. 1.

Although the above discussion has focused on a vehicle energy management performed depending on information that is delivered between the vehicle management apparatus 10 and the service apparatus 20, this is exemplary only and not to be considered as a limitation of the invention. Alternatively, a vehicle energy management may be performed using a terminal possessed by a user.

Now, this alternative case will be described in detail with reference to FIG. 2.

Figure 2:
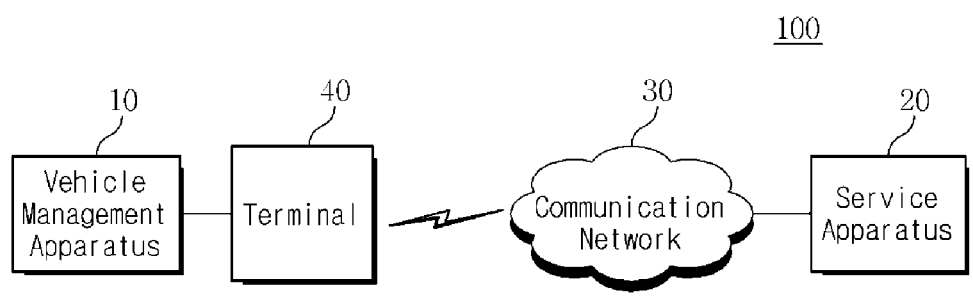
FIG. 2 is a schematic diagram illustrating a vehicle energy management system in accordance with another embodiment of the present invention.

FIG. 2 is a schematic diagram illustrating a vehicle energy management system in accordance with another embodiment of the present invention.

In the following description with reference to FIG. 2, most elements of the vehicle energy management system 100 except a terminal 40 will be not described to avoid the repetition of the same as described with reference to FIG. 1. The following discussion will focus on operations at the terminal 40.

In this embodiment, the vehicle energy management system 100 further includes the terminal 40 that receives information about in-vehicle electric power from the vehicle management apparatus 10 and transmits the received information to the service apparatus 20. Also, the terminal 40 controls the vehicle management apparatus 10, based on a command received from the service apparatus 20.

The vehicle management apparatus 10 monitors the state of a vehicle, periodically checks information about the current battery power of the vehicle, and transmits them to the terminal 40.

Specifically, in the first embodiment of this invention, the terminal 40 receives vehicle operation data from the vehicle management apparatus 10, calculates information about operation pattern of a vehicle by analyzing the received vehicle operation data in given periods, and calculates electric power required for vehicle operation on the basis of the operation pattern information. Furthermore, the terminal 40 transmits, to the service apparatus 20, an electric power transaction request including information about surplus electric power that corresponds to the current battery power minus the electric power required for vehicle operation. If electric power transaction information is received from the service apparatus 20, the terminal 40 transmits a control command to the vehicle management apparatus 10 to sell surplus electric power.

In the second embodiment of this invention, the terminal 40 receives current battery power information from the vehicle management apparatus 10, receives weather information from the service apparatus 20, and calculates electric power required for vehicle operation on the basis of the weather information. Furthermore, the terminal 40 transmits, to the service apparatus 20, an electric power transaction request including information about surplus electric power that corresponds to the current battery power minus the electric power required for vehicle operation. If electric power transaction information is received from the service apparatus 20, the terminal 40 transmits a control command to the vehicle management apparatus 10 to sell surplus electric power.

In the third embodiment of this invention, the terminal 40 receives current battery power information from the vehicle management apparatus 10, checks the number of times to receive location information signals, and transmits to the service apparatus 20 the current battery power information and the number of times to receive location information signals. If the adjusted number of times to receive location information signals is received from the service apparatus 20, the terminal 40 receives location information signals according to the adjusted number of times.

Additionally, without communicating with the service apparatus 20, the terminal 40 receives current battery power information from the vehicle management apparatus 10 and compares the current battery power with a predetermined threshold. Then, depending on comparison results, the terminal 40 adjusts the number of times to receive location information signals and receives the location information signals according to the adjusted number of times.

The location information signal is received by the terminal 40. In a situation of being connected to the vehicle management apparatus 10, for example, in a situation of using electric power stored in the vehicle management apparatus 10, the terminal 40 controls reception of location information signals in view of the current battery power so as to reduce unnecessary power consumption.

Hereinbefore, the vehicle energy management system 100 having the terminal 40 according to another embodiment of the invention has been described with reference to FIG. 2.

In this case, the terminal 40 may be connected to the service apparatus 20 through the communication network 30, using various protocols available for access to the communication network 30. For example, the terminal 40 may access the communication network 30 by means of fixed access technology such as DSL (Digital Subscriber Line), cable modem, or Ethernet. Alternatively, the terminal 40 may access the communication network 30 by means of mobile access technology.

Additionally, the terminal 40 may be connected to the vehicle management apparatus 10 through a short-range wireless communication. Alternatively, any other available communication type may be applied to this invention.

As discussed above, in the second embodiment of this invention, the vehicle management apparatus 10 or the terminal 40 receives weather information from the service apparatus 20, calculates electric power required for vehicle operation on the basis of the weather information, and sells surplus electric power by comparing the calculated electric power with the current battery power.

For this, the service apparatus 20 may collect weather information from at least one weather information provider (not shown) and offer it to the vehicle management apparatus 10 or the terminal 40.

Herein, weather information may be information about atmospheric conditions such as temperature, pressure, humidity, wind direction, wind speed, rainfall, and the like.

Figure 3:
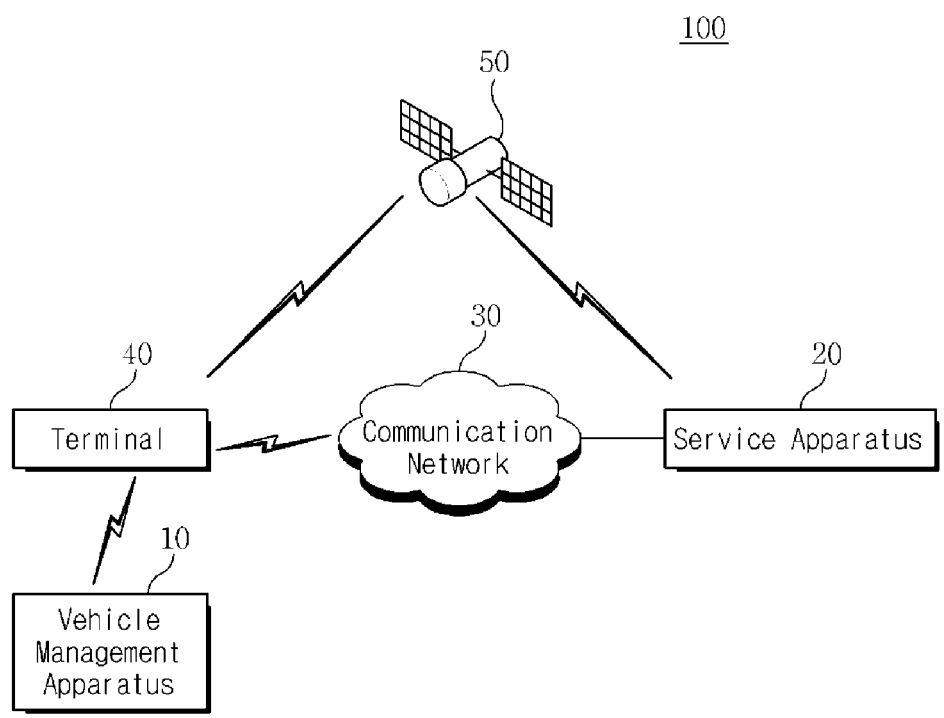
FIG. 3 is a schematic diagram illustrating a vehicle energy management system in accordance with still another embodiment of the present invention.

Furthermore, in the third embodiment of this invention, the number of times to receive location information signals is controlled in view of a power state of a vehicle. For this, as shown in FIG. 3, the vehicle management apparatus 10 or the terminal 40 which has a GPS receiver for receiving, from GPS satellites 50, location information signals (i.e., GPS signals) according to the predetermined number of times and thereby recognizes the current latitudinal and longitudinal location of a vehicle or the terminal 40. Alternatively or additionally, the service apparatus 20 may directly receive, from the GPS satellites 50, location information signals corresponding to the vehicle management apparatus 10 or the terminal 40 according to the predetermined number of times to receive location information signals.

Hereinbefore, the vehicle energy management system 100 in embodiments of the invention has been described. In order to perform a vehicle energy management, the vehicle management apparatus 10 or the terminal 40 may have a specific service program that supports the vehicle energy management. This service program may be a separately installable program or a built-in program. In case of the former case, the service program may be downloaded to the vehicle management apparatus 10 or the terminal 40 from the service apparatus 20 that provides a vehicle energy management service.

A separately installable service program may be created with platform-independent codes that are executed regardless of the type of CPU or OS. Once this service program is installed in the vehicle management apparatus 10 or the terminal 40, a virtual machine loaded in the vehicle management apparatus 10 or the terminal 40 converts the service program into platform-independent codes and then executes them.

Now, more detailed configurations and operations of the vehicle management apparatus 10, the service apparatus 20 and the terminal 40 will be described with reference to FIGS. 4 to 6.

First, the vehicle management apparatus 10 in embodiments of this invention will be described.

Figure 4:
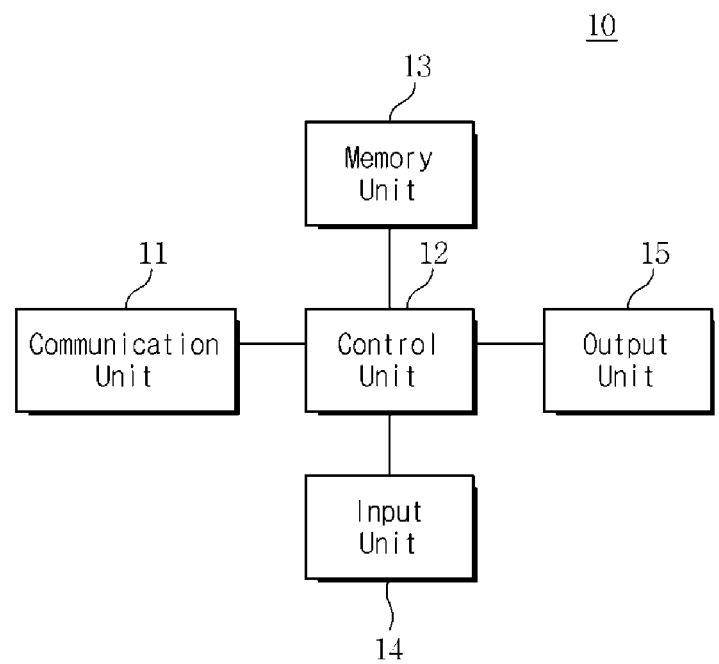
FIG. 4 is a block diagram illustrating a vehicle management apparatus in accordance with an embodiment of the present invention.

FIG. 4 is a block diagram illustrating a vehicle management apparatus in accordance with an embodiment of the present invention.

Referring to FIGS. 1 to 4, the vehicle management apparatus 10 includes a communication unit 11, a control unit 12, a memory unit 13, an input unit 14, and an output unit 15.

The communication unit 11 sends or receives information through the communication network 30. Specifically, the communication unit 11 may transmit information to the service apparatus 20 or the terminal 40 under the control of the control unit 12.

The control unit 12 performs the overall control of the vehicle management apparatus 10 and may be a central processing unit (CPU). Particularly, the control unit 12 performs a vehicle energy management according to three embodiments of this invention. Namely, as discussed above, vehicle energy management techniques of this invention may be classified into three types.

A vehicle energy management technique in the first embodiment is to calculate vehicle operation pattern information and then, based on this, to perform a vehicle energy management. For this, the control unit 12 monitors vehicle operation data, stores the monitored data in the memory unit 13, and calculates vehicle operation pattern information by analyzing the stored data in given periods. For example, the control unit 12 monitors vehicle operation data in given periods, i.e., daily, weekly, monthly, or quarterly, and calculates operation pattern information such as mileage and speed per a given period by patterning the monitored data. Then, based on the operation pattern information, the control unit 12 calculates electric power required for vehicle operation and further calculates surplus electric power that corresponds to the current battery power minus the electric power required for vehicle operation.

If the operation pattern information is obtained from an analysis of daily vehicle operation data, namely if average daily mileage and average daily speed are calculated, electric power required for daily vehicle operation can be estimated using average daily mileage and average daily speed. Then, by subtracting the daily required electric power from the current battery power, surplus electric power can be obtained.

Thereafter, the control unit 12 transmits, to the service apparatus 20, an electric power transaction request including surplus electric power information. If electric power transaction information is received from the service apparatus 20, the control unit 12 sells surplus electric power except the daily required electric power.

The electric power transaction information received from the service apparatus 20 includes a time point of sales for selling surplus electric power on optimal condition and location information about a place available for sales. After receiving the electric power transaction information, the control unit 12 outputs, through the output unit 15, at least one of a transit path, a departure time, and a transit time so as to notify a user of such information.

Specifically, a vehicle user may receive, from the service apparatus 20, electric power transaction information that includes a time point of sales for selling surplus electric power on optimal condition, namely, a time point of the highest power rates due to the highest power demand, and location information about a place available for sales. Thereafter, at the time established by sales condition, the control unit 12 starts to guide a vehicle user to a place available for sales while outputting at least one of a transit path, a departure time and a transit time through the output unit 15.

If a vehicle arrives at a place available for sales, the control unit 12 controls a battery to discharge surplus electric power.

As such, resale of surplus electric power except electric power required for vehicle operation allows an effective use of electric power stored in a vehicle. Also, a vehicle user can sell surplus electric power at a good price, thus gaining a financial advantage.

Furthermore, since electric power is effectively supplied to any load that needs electric power at a peak time of power demand, it can contribute to power system stabilization.

In this embodiment, instead of selling surplus electric power at a good price as discussed above, the vehicle management apparatus 10 can purchase a shortage of electric power at a low price in case where the current battery power is insufficient in comparison with electric power required for vehicle operation.

Specifically, the control unit 12 calculates electric power required for vehicle operation and then compares it with the current battery power. If the current battery power is insufficient, the control unit 12 sends an electric power transaction request including information about a shortage of electric power to the service apparatus 20. Then the control unit 12 receives electric power transaction information from the service apparatus 20 and purchases a shortage of electric power.

In this case, the electric power transaction information may include a time point of purchase for buying a shortage of electric power at the lowest price, and location information about a place available for purchase.

As discussed hereinbefore, the vehicle energy management technique in the first embodiment of this invention calculates vehicle operation pattern information based on vehicle operation data in given periods, calculates electric power required for vehicle operation, and thereby sells surplus electric power at the highest price or purchases a shortage of electric power at the lowest price.

Now, a vehicle energy management technique in the second embodiment of this invention will be described.

This technique is to perform a vehicle energy management based on weather information.

Specifically, when weather information is received from the service apparatus 20, the control unit 12 calculates electric power required for vehicle operation on the basis of the weather information.

The weather information may include various factors that indicate atmospheric conditions such as temperature, pressure, humidity, wind direction, wind speed, rainfall, and the like.

For example, if weather condition is poor due to heavy rain or snow, the surface of a road becomes very unstable. Therefore, such poor weather may cause higher power consumption for vehicle operation than in case of normal weather. Also, if temperature is very low, electric power needed for heating a vehicle may increase. Similarly, if temperature is very high, electric power needed for cooling a vehicle may increase. Namely, electric power required for vehicle operation relies upon weather condition. However, when electric power required for vehicle operation is calculated, weather condition is considered as one of factors that influence the total power consumption of a vehicle.

Thereafter, the control unit 12 checks the current battery power, transmits an electric power transaction request including surplus electric power information to the service apparatus 20. Then the control unit 12 receives electric power transaction information from the service apparatus 20, controls the discharge of a battery, and sells surplus electric power.

Also, like the first embodiment, if the current battery power is insufficient for vehicle operation, the control unit 12 sends an electric power transaction request including information about a shortage of electric power to the service apparatus 20, receives electric power transaction information from the service apparatus 20, and purchases a shortage of electric power.

As discussed hereinbefore, the vehicle energy management technique in the second embodiment of this invention calculates electric power required for vehicle operation in view of weather information, and thereby sells surplus electric power at the highest price or purchases a shortage of electric power at the lowest price.

Now, a vehicle energy management technique in the third embodiment of this invention will be described.

This technique is to adjust the number of times to receive location information signals in view of the current power state of a vehicle.

Specifically, the control unit 12 creates current battery power information by checking the current battery power, compares the current battery power with a predetermined threshold, and depending on comparison results, adjusts the number of times to receive location information signals. In this case, the predetermined threshold indicates the minimum battery power required for operating a vehicle and may be stored in advance in the memory unit 13.

If the current battery power is lower than the predetermined threshold, the control unit 12 decreases the number of times to receive location information signals. If the current battery power is equal to or greater than the predetermined threshold, the control unit 12 maintains or increases the number of times to receive location information signals.

Even while the number of times to receive location information signals is adjusted, the control unit 12 may periodically check the current battery power, compare again the current battery power with the predetermined threshold, and adjust the number of times.

As discussed hereinbefore, the vehicle energy management technique in the third embodiment of this invention adjusts the number of times to receive location information signals on the basis of the current battery power, and thereby regulates power consumption associated with reception of location information signals.

Hereinbefore, the control unit 12 in embodiments of this invention has been described. In order to perform the above-discussed control, the control unit 12 may have a battery monitoring module for monitoring the current battery power, and a control module for performing various control processes according to the current battery power.

Now, the memory unit 13, the input unit 14 and the output unit 15 of the vehicle management apparatus 10 will be described.

The memory unit 13 is configured to store and administer a variety of data required for operation of the vehicle management apparatus 10. The memory unit 13 may store current battery power information measured through the control unit 12, and store monitored vehicle operation data. Also, the memory unit 13 may store a predetermined threshold (i.e., the minimum battery power required for operating a vehicle) used in adjusting the number of times to receive location information signals on the basis of the current battery power.

The memory unit 13 may be formed of a flash memory, a hard disk, a multimedia card micro type memory (e.g., SD or XD memory), RAM, ROM, or the like.

The input unit 14 is configured to deliver, to the control unit 12, electrical signals created by user's input for manipulating the vehicle management apparatus 10. Particularly, if an electric power transaction request including electric power transaction conditions is received from the service apparatus 20, the input unit 14 receives user's input about whether to accept the received transaction conditions.

The input unit 14 may be formed of various input devices, for example, including at least one of a key input device such as a keyboard or a keypad, a touch input device such as a touch sensor or a touch pad, a gesture input device such as a gyro sensor, a geomagnetic sensor, an acceleration sensor, a proximity sensor or a camera, and a voice input device. Additionally, any other input device under development or investigation may be adopted as the input unit.

The output unit 15 is configured to output various functions executed in the vehicle management apparatus 10. Particularly, if electric power transaction information that includes a time point of sales for selling surplus electric power on optimal condition and location information about a place available for sales is received from the service apparatus 20, the output unit 15 may output information such as a transit path, a departure time, and a transit time.

For this, the output unit 15 may have a display module (not shown) for displaying information associated with a vehicle energy management, and an audio processing module (not shown) for converting electric sound signals into analog signals.

The display module (not shown) may be formed of LCD (liquid crystal display), LED (light emitting diodes), OLED (organic LED), AMOLED (active matrix OLED), flexible display, three-dimensional display, or the like. In case of being formed of a touch screen, the display module (not shown) may simultaneously perform functions of the input unit 14.

Meanwhile, when electric power transaction information that includes a time point of sales for selling surplus electric power on optimal condition and location information about a place available for sales is received, the audio processing module (not shown) offers the electric power transaction information to a user by converting it into analog signals.

The output unit 15 is configured to output various functions executed in the vehicle management apparatus 10. Particularly, if from the service apparatus 20, the output unit 15 may output information such as a transit path, a departure time, and a transit time.

Although not illustrated in the drawings, the vehicle management apparatus 10 may further include a GPS receiver (not shown) for receiving location information signals from the GPS satellites 50 according to the predetermined number of times.

As discussed above, the vehicle management apparatus 10 directly communicates with the service apparatus 20 in this embodiment. This is, however, exemplary only and not to be considered as a limitation. In an alternative embodiment, the vehicle management apparatus 10 monitors the current state of a vehicle, checks the current battery power, and transmits the current battery power to the terminal 40 such that the terminal 40 performs related control processes.

This alternative case will be described later with reference to FIG. 6.

Meanwhile, the vehicle management apparatus 10 may be formed as a separate hardware device or alternatively employ an in-vehicle navigation system or a power converter having a communication module. Additionally, any other device which can be installed in a vehicle, communicate with the service apparatus 20, and support input/output functions may be adopted as the vehicle management apparatus 10.

Now, the service apparatus 20 of this invention will be described.

Figure 5:
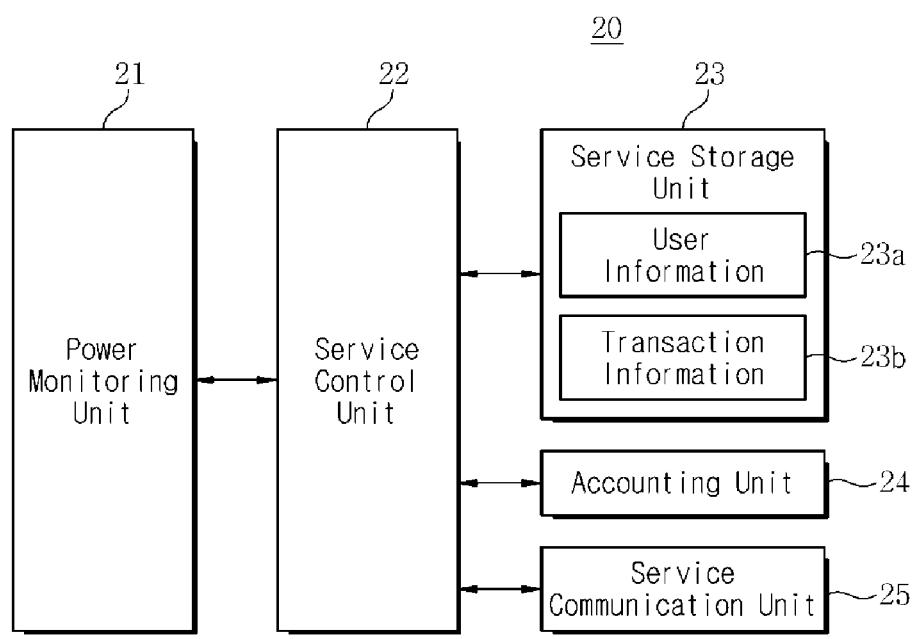
FIG. 5 is a block diagram illustrating a service apparatus in accordance with an embodiment of the present invention.

FIG. 5 is a block diagram illustrating a service apparatus in accordance with an embodiment of the present invention.

Referring to FIGS. 1 and 5, the service apparatus 20 includes a power monitoring unit 21, a service control unit 22, a service storage unit 23, an accounting unit 24, and a service communication unit 25.

The power monitoring unit 21 collects and monitors information about power rates and power demand from the electric power system 200.

The service control unit 22 receives an electric power transaction request from at least one vehicle management apparatus 10. Then, considering information about power rates and power demand received from the electric power system 200, the service control unit 22 creates electric power transaction information for selling electric power on optimal condition, and then transmits it to the vehicle management apparatus 10.

Also, the service control unit 22 performs user authentication for a vehicle and, in response to a success in authentication, may perform the above process.

In other words, if an electric power transaction request received from at least one vehicle management apparatus 10 contains information about surplus electric power, the service control unit 22 creates electric power transaction information for selling surplus electric power on optimal condition and transmits it to the vehicle management apparatus 10. In contrast, if the electric power transaction request contains information about a shortage of electric power, the service control unit 22 creates electric power transaction information for purchasing a shortage of electric power at the lowest price and transmits it to the vehicle management apparatus 10.

The vehicle management apparatus 10 receives information about time and location suitable for selling or purchasing electric power, e.g., a predetermined time and a location of electric vehicle charging station, from the service control unit 22, and then allows performing a charging at the electric vehicle charging station at the predetermined time.

After a charging is completed, the vehicle management apparatus 10 calculates the volume of electric power transaction and transmits it to the service control unit 22 of the service apparatus 20. Then the service control unit 22 delivers the volume of electric power transaction to the accounting unit 24.

Alternatively, the volume of electric power transaction may be just recorded and saved such that a user can purchase later electric power without paying separate costs.

Furthermore, when information for requiring electric power is received from any load or the electric power system 200, the service control unit 22 transmits an electric power supply request to at least one vehicle management apparatus 10 so as to lead other vehicle users to sell their electric power.

This allows electric power to be effectively supplied to any load that needs electric power at a peak time of power demand, thus contributing to power system stabilization.

Besides, such infrastructures allowing purchase of electric power required for vehicles and sales of electric power stored in vehicles may realize simpler transactions of electric power and related effective accounting services.

The service storage unit 23 stores any information associated with electric power transactions including user information 23a, required for user authentication, and transaction information 23b.

Additionally, in order to adjust the number of times to receive location information signals in view of the current battery power when the current battery power information and the number of times are received from the vehicle management apparatus 10, the service storage unit 23 may store in advance a predetermined threshold that indicates the minimum electric power required for vehicle operation.

The accounting unit 24 checks power rates at the time when a vehicle user sells or purchases electric power. Then, based on the volume of electric power transaction, the accounting unit 24 calculates accounting data and transmits it to the service control unit 22.

The service communication unit 25 delivers information through the communication network 30 among the vehicle management apparatus 10, the terminal 40 and the electric power system 200. Additionally, the service communication unit 25 collects weather information from at least one weather information provider (not shown) and offers it to the vehicle management apparatus 10 or the terminal 40.

The above-discussed service apparatus 20 may be constructed as one or more servers that operate in a server-based computing configuration or a cloud configuration. Particularly, in embodiments of this invention, any information transmitted or received through the vehicle energy management system may be provided through a cloud computing function that may be permanently stored in a cloud computing device on Internet. A cloud computing refers to a technique to offer on-demand IT (information technology) resources such as hardware (i.e., server, storage, network, etc.), software (i.e., database, security, web, etc.), service and data, virtualized using Internet technology, to any digital device such as a desktop, a tablet computer, a notebook, a netbook, and a smart phone. In this invention, all kinds of information delivered between the vehicle management apparatus 10 and the service apparatus 20 may be stored in a cloud computing device on Internet and also transmitted anytime and anywhere.

As mentioned above, a vehicle energy management not only is performed depending on information delivered between the vehicle management apparatus 10 and the service apparatus 20, but also is performed using a terminal possessed by a user.

Now, configurations and operations of the terminal will be described.

Figure 6:
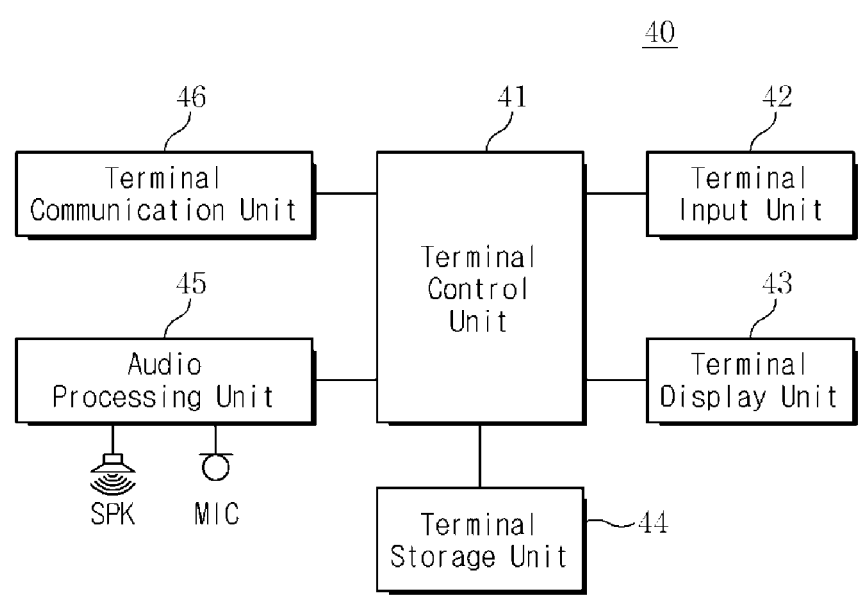
FIG. 6 is a block diagram illustrating a terminal in accordance with an embodiment of the present invention.

FIG. 6 is a block diagram illustrating a terminal in accordance with an embodiment of the present invention.

Referring to FIGS. 2 and 6, the terminal 40 includes a terminal control unit 41, a terminal input unit 42, a terminal display unit 43, a terminal storage unit 44, an audio processing unit 45, and a terminal communication unit 46.

The terminal control unit 41 may be a processor that drives an operating system (OS) and respective components. For example, the terminal control unit 41 may be a central processing unit (CPU). Once power of the terminal 40 is turned on, the terminal control unit 41 shifts the operating system from an auxiliary memory unit to a main memory unit and then performs a booting process for driving the operating system.

Particularly, the terminal control unit 41 controls a connection with the vehicle management apparatus 10 through a short-range wireless communication. The terminal control unit 41 connected to the vehicle management apparatus 10 may periodically receive current battery power information. Also, the terminal control unit 41 controls a connection with the service apparatus 20 through the communication network 30. The terminal control unit 41 connected to the service apparatus 20 may periodically receive location information signals and perform various controls for a vehicle energy management.

For example, if current battery power information and vehicle operation data are received from the vehicle management apparatus 10, the terminal control unit 41 calculates information about operation pattern of a vehicle through analysis in given periods, and calculates electric power required for vehicle operation on the basis of the operation pattern information. Furthermore, the terminal control unit 41 transmits, to the service apparatus 20, an electric power transaction request including information about surplus electric power that corresponds to the current battery power minus the electric power required for vehicle operation. If electric power transaction information is received from the service apparatus 20, the terminal control unit 41 transmits a control command to the vehicle management apparatus 10 to sell surplus electric power.

In another example, if current battery power information is received from the vehicle management apparatus 10, and if weather information is received from the service apparatus 20, the terminal control unit 41 calculates electric power required for vehicle operation on the basis of the weather information. Furthermore, the terminal control unit 41 creates and transmits, to the service apparatus 20, an electric power transaction request including information about surplus electric power that corresponds to the current battery power minus the electric power required for vehicle operation. If electric power transaction information is received from the service apparatus 20, the terminal control unit 41 transmits a control command to the vehicle management apparatus 10 to sell surplus electric power.

In this example, if the current battery power is insufficient, the terminal control unit 41 creates information about a shortage of electric power and sends an electric power transaction request including the electric power shortage information to the service apparatus 20. Then, if electric power transaction information is received from the service apparatus 20, the terminal control unit 41 transmits a control command to the vehicle management apparatus 10 to purchase a shortage of electric power.

In still another example, if current battery power information is received from the vehicle management apparatus 10, the terminal control unit 41 checks the predetermined number of times to receive location information signals and then transmits the current battery power information and the predetermined number of times to the service apparatus 20. If the adjusted number of times is received from the service apparatus 20, the terminal control unit 41 controls a GPS receiver (not shown) to receive location information signals according to the adjusted number of times.

In this example, if current battery power information is received, the terminal control unit 41 may not transmit the current battery power information and the number of times to receive location information signals to the service apparatus 20 after checking the current battery power. Instead, the terminal control unit 41 compares the current battery power with a predetermined threshold, and depending on comparison results, adjusts the number of times to receive location information signals.

As mentioned above, the predetermined threshold indicates the minimum battery power required for operating a vehicle. If the current battery power is lower than the predetermined threshold, the terminal control unit 41 decreases the number of times to receive location information signals. In contrast, if the current battery power is equal to or greater than the predetermined threshold, the terminal control unit 41 maintains or increases the number of times to receive location information signals.

Thereafter, the terminal control unit 41 controls a GPS receiver (not shown) such that location information signals are received according to the adjusted number of times.

In order to adjust the number of times to receive location information signals at the terminal 40 in view of the current battery power, the terminal 40 had better be in state of being connected to a vehicle, namely, of using electric power stored in a vehicle. Therefore, while the terminal 40 uses electric power of a vehicle (for example, when the terminal 40 is charged using electric power of a vehicle), the number of times to receive location information signals at the terminal 40 is adjusted according to a power state of a vehicle.

The terminal input unit 42 receives an input of various numbers, letters, and other keys, creates an input signal for performing or controlling various functions of the terminal 40, and delivers it to the terminal control unit 41. The terminal input unit 42 may have at least one of a keypad and a touch pad which creates an input signal in response to user's touch or other manipulating actions. In some embodiments, together with the terminal display unit 43, the terminal input unit 42 may be formed of a touch panel (or a touch screen) capable of performing both input and display functions. Additionally, the terminal input unit 42 may use a typical input device such as a keyboard, a keypad, a mouse, or a joystick, and also employ any other input device under development or investigation.

The terminal display unit 43 visually offers information associated with operating states and results while the terminal 40 performs its function. Also, the terminal display unit 43 may display menus of the terminal 40, user data inputted by a user, and the like. The terminal display unit 43 may be formed of LCD (liquid crystal display), TFT-LCD (thin film transistor LCD), OLED (organic light emitting diodes), LED, AMOLED (active matrix OLED), flexible display, three-dimensional display, or the like. In case of being formed of a touch screen, the terminal display unit 43 may perform parts or all of functions of the terminal input unit 42.

The terminal storage unit 44 is a device for storing data, includes a main memory unit and an auxiliary memory unit, and stores applications required for functions of the terminal 40. When the terminal 40 activates a particular function in response to user's request, a corresponding one of such applications is executed to provide the function under the control of the terminal control unit 41. Meanwhile, the terminal storage unit 44 may be composed of a program region and a data region. The program region stores an operating system for booting the terminal 40, a program for comparing the current battery power with a predetermined threshold, and the like. The data region stores data created in use of the terminal 40. Particularly, the data region stores current battery power information, location information signals, and the like.

The audio processing unit 45 not only converts a digital audio signal into an analog audio signal and then outputs it through a speaker (SPK), but also converts an analog audio signal received from a microphone (MIC) into a digital audio signal and then delivers it to the terminal control unit 41.

The terminal communication unit 46 performs functions to transmit or receive data to or from the service apparatus 20 through the communication network 30. Particularly, the terminal communication unit 46 communicates with the vehicle management apparatus 10 so as to receive current battery power information, and also communicates with the service apparatus 20 so as to transmit or receive various types of information for a vehicle energy management.

Although not illustrated in the drawings, the terminal 40 may further include a GPS receiver (not shown) for receiving location information signals (i.e., GPS signals) from the GPS satellites 50 shown in FIG. 3 so as to recognize the current latitudinal and longitudinal location of the terminal 40.

Although main elements of the vehicle management apparatus 10, the service apparatus 20 and the terminal 40 have been described hereinbefore with reference to FIGS. 4 to 6, all of these elements are not always essential. In some embodiments, some of them may be removed, and any other elements may be additionally or alternatively used.

Now, a vehicle energy management method in embodiments of this invention will be described.

As discussed above, a vehicle energy management method of this invention may be performed in three embodiments.

In summary, the vehicle energy management method in the first embodiment is performed on the basis of operation pattern of a vehicle, the vehicle energy management method in the second embodiment is performed on the basis of weather information, and the vehicle energy management method in the third embodiment is performed to adjust the number of times to receive location information signals in view of the current power state of a vehicle.

First, the vehicle energy management method in the first embodiment will be described with reference to FIGS. 7 to 10. Although the following description is focused on a vehicle energy management performed through a communication between the vehicle management apparatus 10 and the service apparatus 20, this is exemplary only and not to be considered as a limitation. Alternatively, the vehicle management apparatus 10 may monitor a current battery state of a vehicle and then send related information to the terminal 40. Furthermore, the terminal 40 may send, to the service apparatus 20, information received from the vehicle management apparatus 10 and also send a control command to the vehicle management apparatus 10 by communicating with the service apparatus 20.

Figure 7:
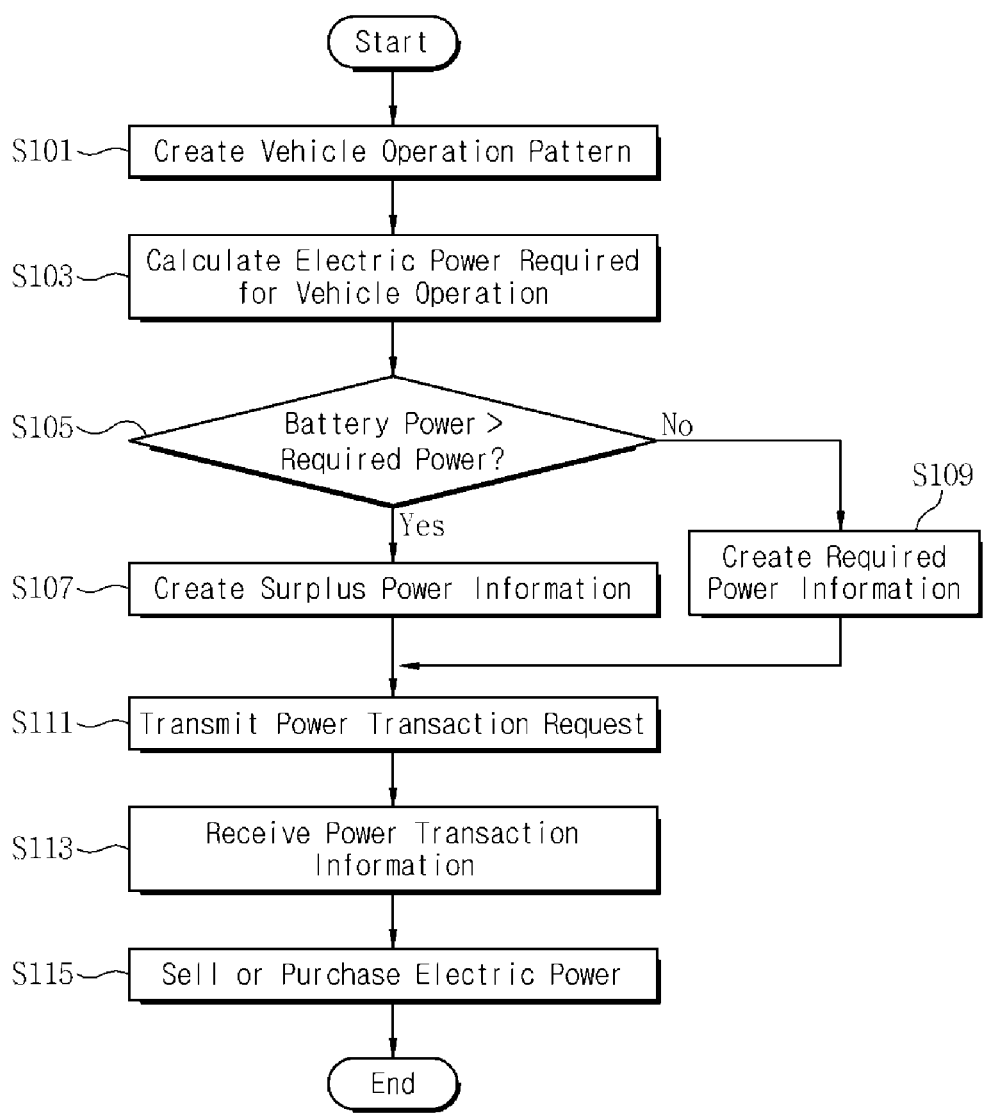
FIG. 7 is a flow diagram illustrating a vehicle energy management method at a vehicle management apparatus in accordance with the first embodiment of the present invention.

FIG. 7 is a flow diagram illustrating a vehicle energy management method at a vehicle management apparatus in accordance with the first embodiment of the present invention.

Referring to FIGS. 1 and 7, the vehicle energy management method in this embodiment begins with monitoring vehicle operation data in given periods, i.e., daily, weekly, monthly, or quarterly. Then, based on such monitored data, the vehicle management apparatus 10 creates vehicle operation pattern information such as mileage and speed per a given period at step S101. Also, the vehicle management apparatus 10 calculates electric power required for vehicle operation at step S103, based on the vehicle operation pattern information, and then compares the required electric power with the current battery power at step S105.

If the current battery power exceeds the required electric power, the vehicle management apparatus 10 calculates surplus electric power and thereby creates surplus electric power information at step S107. If the current battery power is less than the required electric power, the vehicle management apparatus 10 calculates a shortage of electric power and thereby creates electric power shortage information at step S109. Also, at step S111, the vehicle management apparatus 10 transmits, to the service apparatus 20, an electric power transaction request including the surplus electric power information or the electric power shortage information.

Thereafter, if electric power transaction information is received from the service apparatus 20 at step S113, the vehicle management apparatus 10 checks the received electric power transaction information and then sells surplus electric power or purchases a shortage of electric power at step S115.

The electric power transaction information received from the service apparatus 20 includes a time point of sales for selling surplus electric power on optimal condition or a time point of purchase for buying a shortage of electric power at the minimum price, and location information about a place available for sales or purchase, i.e., a location of electric vehicle charging station.

As such, by selling surplus electric power or buying a shortage of electric power after calculating electric power required for vehicle operation on the basis of a vehicle operation pattern, it is possible to improve the energy use efficiency or prevent the power exhaustion in driving.

Now, a vehicle energy management method at the service apparatus 20 will be described.

Figure 8:
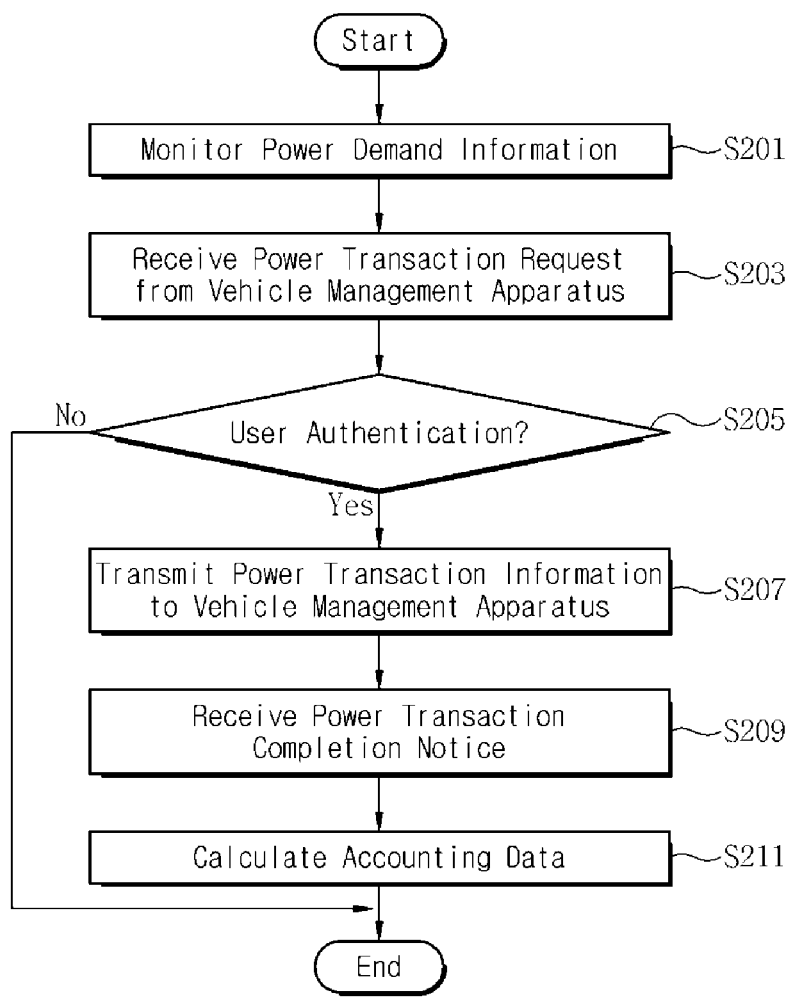
FIG. 8 is a flow diagram illustrating a vehicle energy management method at a service apparatus in accordance with the first embodiment of the present invention.

FIG. 8 is a flow diagram illustrating a vehicle energy management method at a service apparatus in accordance with the first embodiment of the present invention.

Referring to FIGS. 1 and 8, the service apparatus 20 monitors, at step S201, information about power rates and power demand received from the electric power system 200 and, at step S203, receives from the vehicle management apparatus 10 an electric power transaction request including surplus electric power information or electric power shortage information.

Then, at step S205, the service apparatus 20 performs user authentication for a vehicle that sends the electric power transaction request. This authentication is to effectively perform accounting process associated with electric power transaction. In some cases, step S205 may be omitted.

After a success in user authentication, the service apparatus 20 transmits at step S207, to the vehicle management apparatus 10, electric power transaction information for selling electric power on optimal condition or for buying electric power at the minimum price.

Thereafter, when a notice of electric power transaction completion is received from the vehicle management apparatus 10 at step S209, the service apparatus 20 calculates the volume of electric power transaction and determines accounting data at step S211.

Meanwhile, based on accounting data, the service apparatus 20 may pay a sale value to a user or request a purchase value from a user, or alternatively accumulate a sale or purchase value.

Although the above-discussed electric power transaction method is focused on sales and purchase using electric power systems, it is alternatively possible to apply the method to any load, e.g., a house, having interfaces for sending or receiving electric power.

Now, a vehicle energy management method in the first embodiment of this invention will be described in detail.

Figure 9:
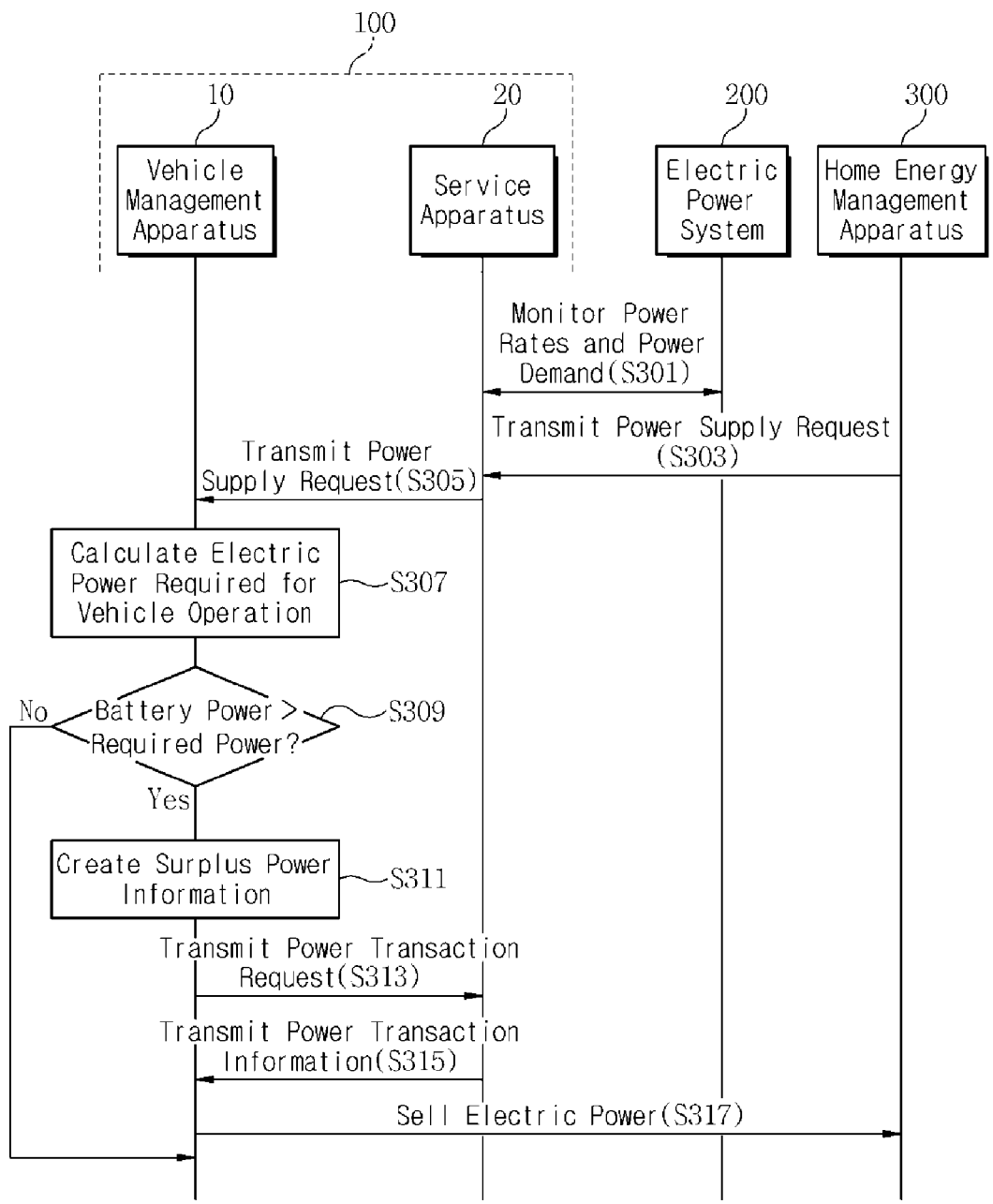
FIG. 9 is a flow diagram illustrating a vehicle energy management method in accordance with the first embodiment of the present invention.

FIG. 9 is a flow diagram illustrating a vehicle energy management method in accordance with the first embodiment of the present invention.

Referring to FIG. 9, the service apparatus 20 of the vehicle energy management system 100 performs, at step S301, a continuous monitoring for information about power rates and power demand from the electric power system 200. If a power supply request is received, at step S303, from a home energy management apparatus 300 of a certain house during the monitoring, the service apparatus 20 delivers the received power supply request to at least one vehicle management apparatus 10 at step S305. Meanwhile, in an alternative case, the home energy management apparatus 300 may transmit the power supply request to the electric power system 200 instead of directly sending it to the service apparatus 20. Additionally, the service apparatus 20 may deliver the received power supply request at a peak time of power demand.

When the power supply request is received from the service apparatus 20, the vehicle management apparatus 10 calculates electric power required for vehicle operation at step S307, based on the vehicle operation pattern information, and then compares the required electric power with the current battery power at step S309. If the current battery power exceeds the required electric power, the vehicle management apparatus 10 creates, at step S311, surplus electric power information by calculating surplus electric power and transmits, at step S313, an electric power transaction request including the surplus electric power information to the service apparatus 20. Then, the service apparatus 20 determines time and location for selling electric power on optimal condition, based on the information about power rates and power demand received from the electric power system 200. Also, the service apparatus 20 transmits electric power transaction information containing the above-determined time and location to the vehicle management apparatus 10 at step S315. Then the vehicle management apparatus 10 determines whether a transaction condition is proper, and if so, sells electric power to the home energy management apparatus 300 at step S317.

Now, a vehicle energy management method in case of including the terminal 40 will be described.

Figure 10:
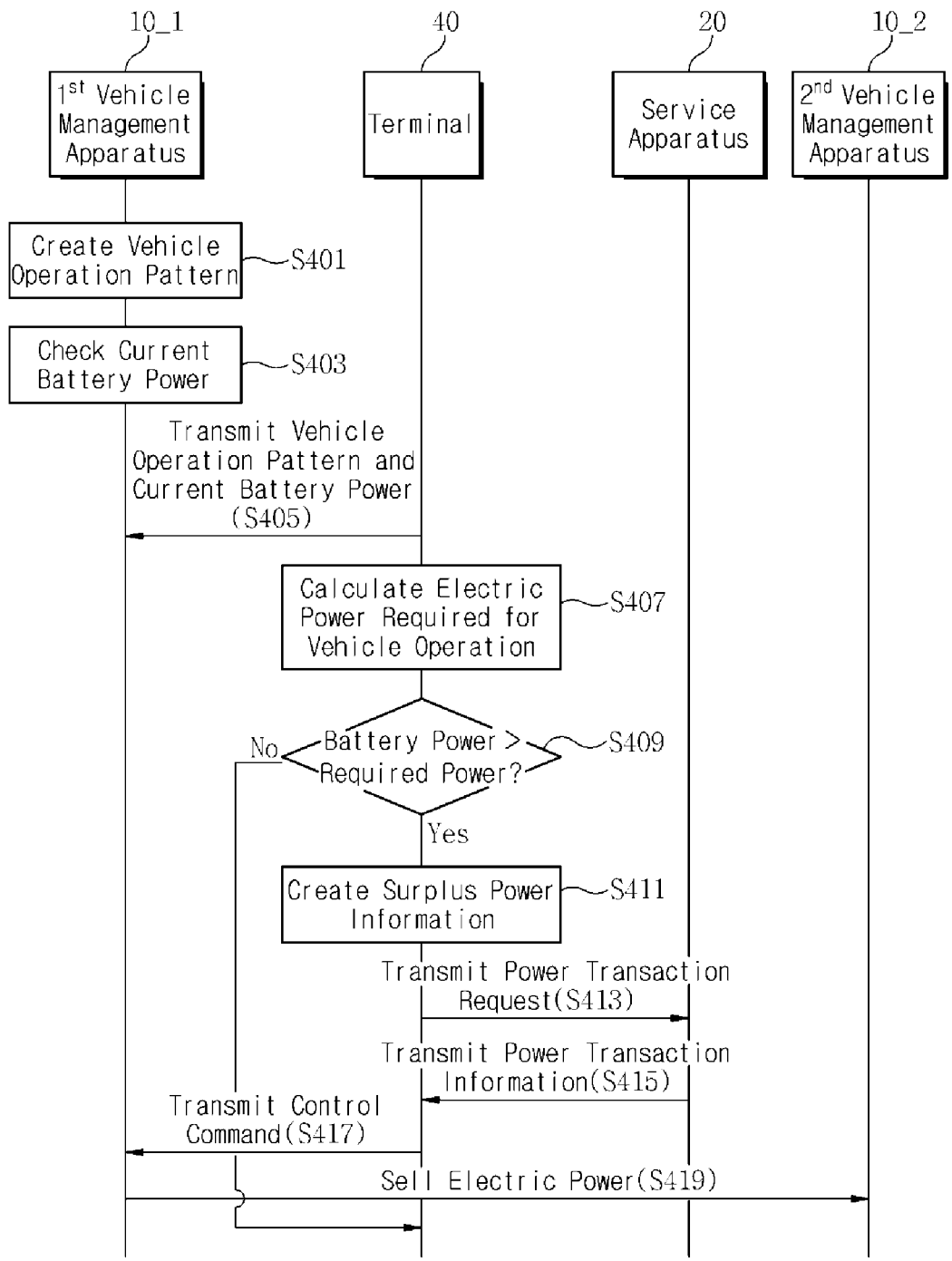
FIG. 10 is a flow diagram illustrating a vehicle energy management method in consideration for a terminal in accordance with the first embodiment of the present invention.

FIG. 10 is a flow diagram illustrating a vehicle energy management method in consideration for a terminal in accordance with the first embodiment of the present invention.

Referring to FIGS. 2 and 10, the first vehicle management apparatus 10_1 desires to sell surplus electric power to other vehicle management apparatus or any other load, and the second vehicle management apparatus 10_2 needs electric power. Additionally, as discussed above with reference to FIG. 9, the service apparatus 20 monitors information about power rates and power demand from the electric power system (not shown).

At step S401, the first vehicle management apparatus 10_1 monitors vehicle operation data in given periods, i.e., daily, weekly, monthly, or quarterly, and then, based on such monitored data, creates vehicle operation pattern information such as mileage and speed per a given period. Also, at step S403, the first vehicle management apparatus 10_1 checks the current battery power and creates current battery power information. Then, at step S405, the first vehicle management apparatus 10_1 transmits the vehicle operation pattern information and the current battery power information to the terminal 40. The terminal 40 receiving such information calculates, at step S407, electric power required for vehicle operation, based on the vehicle operation pattern information, and then compares the required electric power with the current battery power at step S409.

If the current battery power exceeds the required electric power, the terminal 40 calculates surplus electric power and thereby creates surplus electric power information at step S411. Then the terminal 40 transmits, to the service apparatus 20, an electric power transaction request including the surplus electric power information at step S413.

Although not illustrated in the drawings, the service apparatus 20 receiving the electric power transaction request notifies other vehicle management apparatus, e.g., the second vehicle management apparatus 10_2, that the first vehicle management apparatus 10_1 has surplus electric power and requests an electric power transaction.

Thereafter, the second vehicle management apparatus 10_2 transmits, to the service apparatus 20, an electric power transaction request including information about a shortage of electric power. A process of calculating a shortage of electric power at the second vehicle management apparatus 10_2 is similar to steps S401 to S409. Namely, the second vehicle management apparatus 10_2 sends the vehicle operation pattern information and the current battery power information to a corresponding terminal. Then this terminal calculates electric power required for vehicle operation, creates a shortage of electric power information when the current battery power is less than the required electric power, and sends the electric power transaction request to the service apparatus 20.

Meanwhile, the first and second vehicle management apparatuses 10_1 and 10_2 may further send information about the current location of a vehicle to the service apparatus 20.

At step S415, the service apparatus 20 transmits, to the terminal 40, electric power transaction information including information about the second vehicle management apparatus 10_2. Then the terminal 40 moves to a specific location at a specific time, based on the electric power transaction information. In a state capable of transaction with the second vehicle management apparatus 10_2, the service apparatus 20 transmits a control command for a battery discharge to the first vehicle management apparatus 10_1 at step S417. Then, at step S419, the first vehicle management apparatus 10_1 performs sales by supplying electric power to the second vehicle management apparatus 10_2.

Hereinbefore, the vehicle energy management method in the first embodiment has been described with reference to FIGS. 7 to 10.

Now, the vehicle energy management method considering weather information in the second embodiment will be described with reference to FIGS. 11 to 13.

Although the following description is focused on a communication between the vehicle management apparatus 10 and the service apparatus 20, this is exemplary only and not to be considered as a limitation. Alternatively, such a communication may further rely upon the terminal 40.

Figure 11:
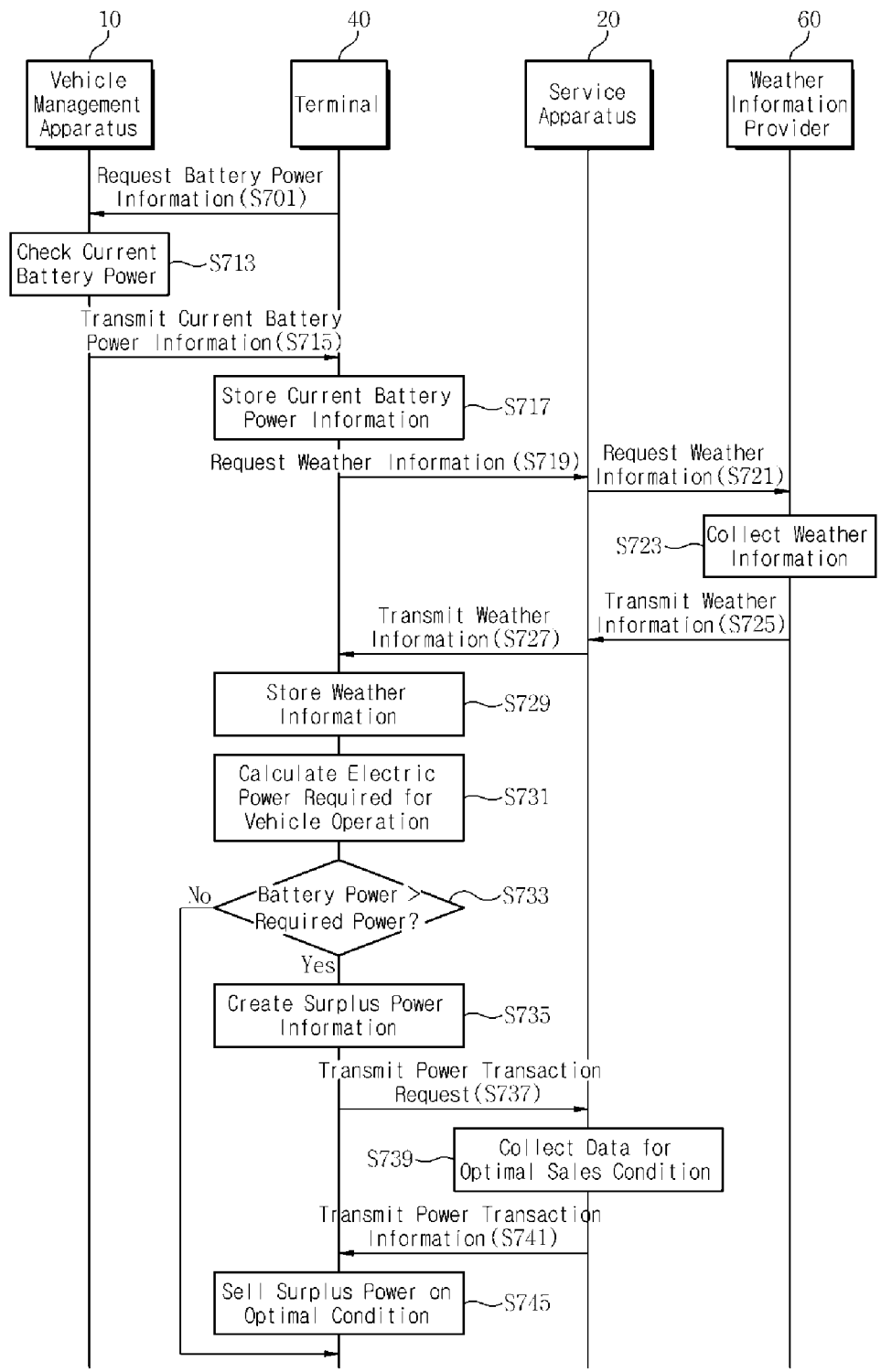
FIG. 11 is a flow diagram illustrating a vehicle energy management method at a vehicle management apparatus in accordance with the second embodiment of the present invention.

FIG. 11 is a flow diagram illustrating a vehicle energy management method at a vehicle management apparatus in accordance with the second embodiment of the present invention.

Referring to FIGS. 1 and 11, the vehicle management apparatus 10 checks the current battery power of a vehicle at step S501, and collects weather information from the service apparatus 20 at step S503. Alternatively, the vehicle management apparatus 10 may receive weather information before checking the current battery power.

At step S505, the vehicle management apparatus 10 calculates electric power required for vehicle operation in view of weather information. In this step, the calculated electric power refers to the total amount of electric power needed for controlling various devices, e.g., air conditioner, equipped in a vehicle.

At step S507, the vehicle management apparatus 10 compares the required electric power with the current battery power. If the current battery power exceeds the required electric power, the vehicle management apparatus 10 calculates surplus electric power and thereby creates surplus electric power information at step S509. If the current battery power is less than the required electric power, the vehicle management apparatus 10 calculates a shortage of electric power and thereby creates electric power shortage information at step S511. Also, at step S513, the vehicle management apparatus 10 transmits, to the service apparatus 20, an electric power transaction request including the surplus electric power information or the electric power shortage information. Thereafter, if electric power transaction information is received from the service apparatus 20 at step S515, the vehicle management apparatus 10 checks the received electric power transaction information and then sells surplus electric power or purchases a shortage of electric power at step S517.

The electric power transaction information received from the service apparatus 20 includes a time point of sales for selling surplus electric power on optimal condition or a time point of purchase for buying a shortage of electric power at the minimum price, and location information about a place available for sales or purchase, i.e., a location of electric vehicle charging station.

The vehicle energy management method at the service apparatus 20 in the second embodiment is similar to that described previously with reference to FIG. 8, except that in the second embodiment the service apparatus 20 offers, to the vehicle management apparatus 10, weather information received from at least one weather information provider (not shown). Therefore, related descriptions will be omitted herein.

Now, the vehicle energy management method in the second embodiment will be described in detail.

Figure 12:
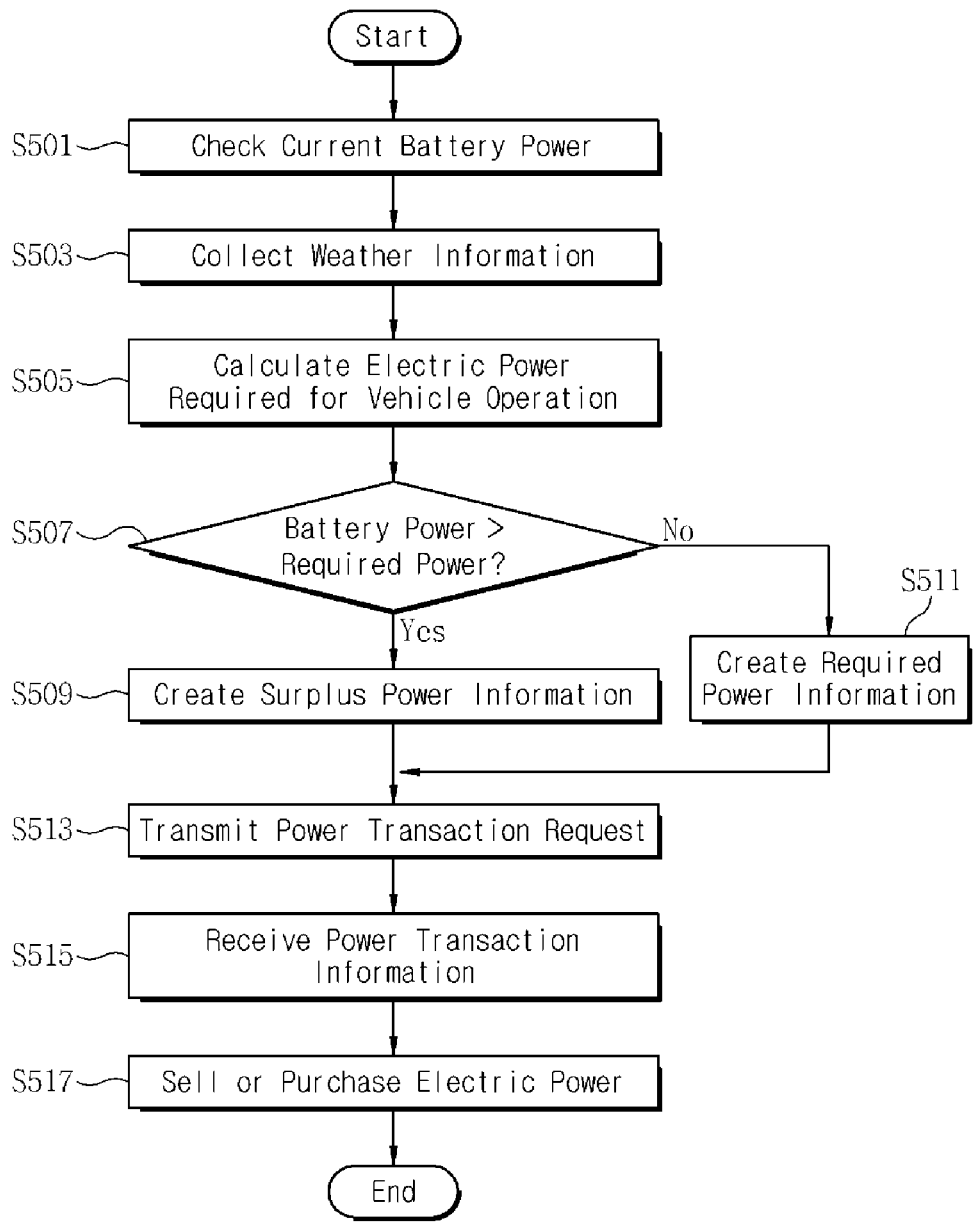
FIG. 12 is a flow diagram illustrating a vehicle energy management method in accordance with the second embodiment of the present invention.

FIG. 12 is a flow diagram illustrating a vehicle energy management method in accordance with the second embodiment of the present invention.

The following description of the vehicle energy management method shown in FIG. 12 will be focused on configurations that the terminal 40 calculates electric power required for vehicle operation after the vehicle management apparatus 10 provides current battery power information to the terminal 40.

At step S701, the terminal 40 requests current battery power information from the vehicle management apparatus 10. Then the vehicle management apparatus 10 checks the current battery power at step S713, creates the current battery power information, and transmits it to the terminal 40 at step S715.

At step S717, the terminal 40 stores the current battery power information. Thereafter, the terminal 40 requests weather information from the service apparatus 20 at step S719, and the service apparatus 20 requests the weather information from the weather information provider 60 at step S721. Then the weather information provider 60 collects weather information at step S723 and transmits the collected weather information to the service apparatus 20 at step S725.

Thereafter, the service apparatus 20 transmits the received weather information to the terminal 40 at step S727, and the terminal 40 stores the received weather information at step S729.

Although the above-discussed steps S719 to S727 are case where the terminal 40 requests the service apparatus 20 to provide weather information, this is exemplary only and not to be considered as a limitation. In an alternative case, the service apparatus 20 may send periodically the weather information to the terminal 40 even though the terminal 40 does not request the service apparatus 20 to provide weather information.

Thereafter, the terminal 40 calculates electric power required for vehicle operation in view of weather information at step S731, and compares the required electric power with the current battery power at step S733. If the current battery power exceeds the required electric power, the vehicle management apparatus 10 calculates, at step S735, surplus electric power that corresponds to the current battery power minus the electric power required for vehicle operation. Thereafter, the terminal 40 transmits, at step S327, an electric power transaction request including the surplus electric power information to the service apparatus 20, and the service apparatus 20 collects data for optimal sales condition at step S739.

For example, the service apparatus 20 collects data such as a time point of sales for selling surplus electric power on optimal condition, location information about a place available for sales, and the like.

Thereafter, the service apparatus 20 transmits, to the terminal 40, electric power transaction information including the collected data at step S741. Then, at step S745, the terminal 40 controls the vehicle management apparatus 10 and sells the surplus electric power on optimal condition to other load or electric power system.

Hereinbefore, the vehicle energy management method considering weather information in the second embodiment has been described.

Now, the vehicle energy management method controlling reception of location information signals in view of the current battery power in the third embodiment will be described with reference to FIGS. 13 to 16.

Figure 13:
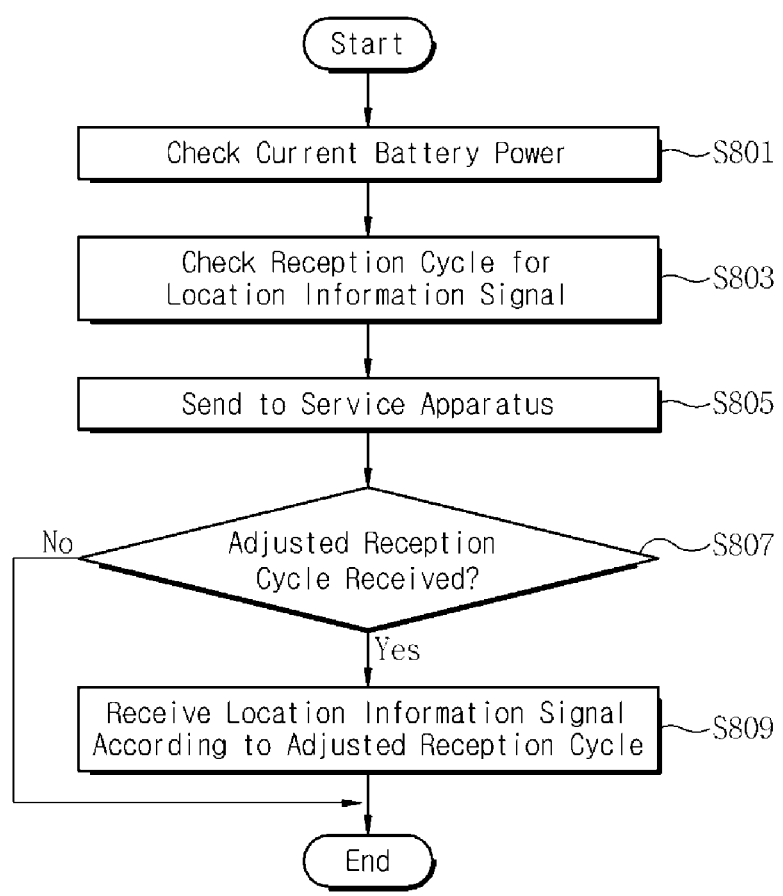
FIG. 13 is a flow diagram illustrating a vehicle energy management method for controlling reception of a location information signal in consideration for the current battery power in accordance with the third embodiment of the present invention.

FIG. 13 is a flow diagram illustrating a vehicle energy management method for controlling reception of a location information signal in consideration for the current battery power in accordance with the third embodiment of the present invention.

Referring to FIGS. 3 and 13, the vehicle management apparatus 10 checks the current battery power at step S801, and also checks the predetermined number of times to receive location information signals at step S803.

Then the vehicle management apparatus 10 transmits the current battery power information and the number of times to the service apparatus 20 at step S805. If information about the adjusted number of times is received from the service apparatus 20 at step S807, the vehicle management apparatus 10 receives at step S809 the location information signals from the GPS satellites 50 according to the adjusted number of times.

Namely, if location information signals are frequently received, power consumption may increase due to reception of the location information signals. Therefore, if the current battery power is lower than a predetermined threshold, it is desirable that the location information signals are less frequently received.

Although it is described at step S805 that the current battery power information and the number of times to receive location information signals are sent to the service apparatus 20, such information may be transmitted to the terminal 40. Similarly, information about the adjusted number of times to receive location information signals may be received through the terminal 40.

Alternatively, the vehicle management apparatus 10 may adjust directly the number of times to receive location information signals without communicating with the terminal 40 or the service apparatus 20.

Now, this alternative case will be described with reference to FIG. 14.

Figure 14:
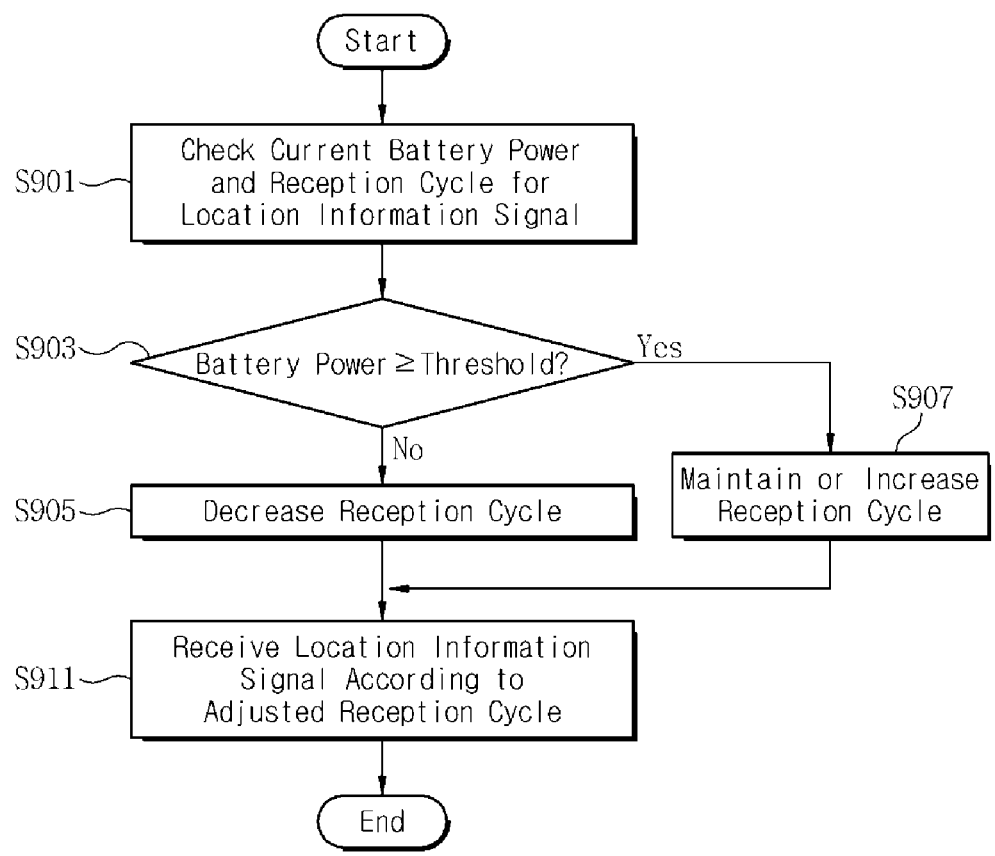
FIG. 14 is a flow diagram illustrating a method for adjusting reception of a location information signal in consideration for the current battery power at a vehicle management apparatus in accordance with the third embodiment of the present invention.

FIG. 14 is a flow diagram illustrating a method for adjusting reception of a location information signal in consideration for the current battery power at a vehicle management apparatus in accordance with the third embodiment of the present invention.

Referring to FIGS. 3 and 14, the vehicle management apparatus 10 checks the current battery power information and the number of times to receive location information signals at step S901, and compares the current battery power with a predetermined threshold at step S903. As discussed above, the predetermined threshold indicates the minimum battery power required for operating a vehicle. If the current battery power is lower than the predetermined threshold, the control unit 12 decreases at step S905 the number of times to receive location information signals so as to reduce power consumption. If the current battery power is equal to or greater than the predetermined threshold, the control unit 12 maintains or increases at step S907 the number of times.

Thereafter, at step S911, the vehicle management apparatus 10 receives location information signals, depending on the adjusted number of times to receive location information signals.

Now, two methods for controlling reception of location information signals in view of the current battery power in the third embodiment will be described. These methods correspond to cases of being performed at the terminal 40 and at the service apparatus 20, respectively.

Figure 15:
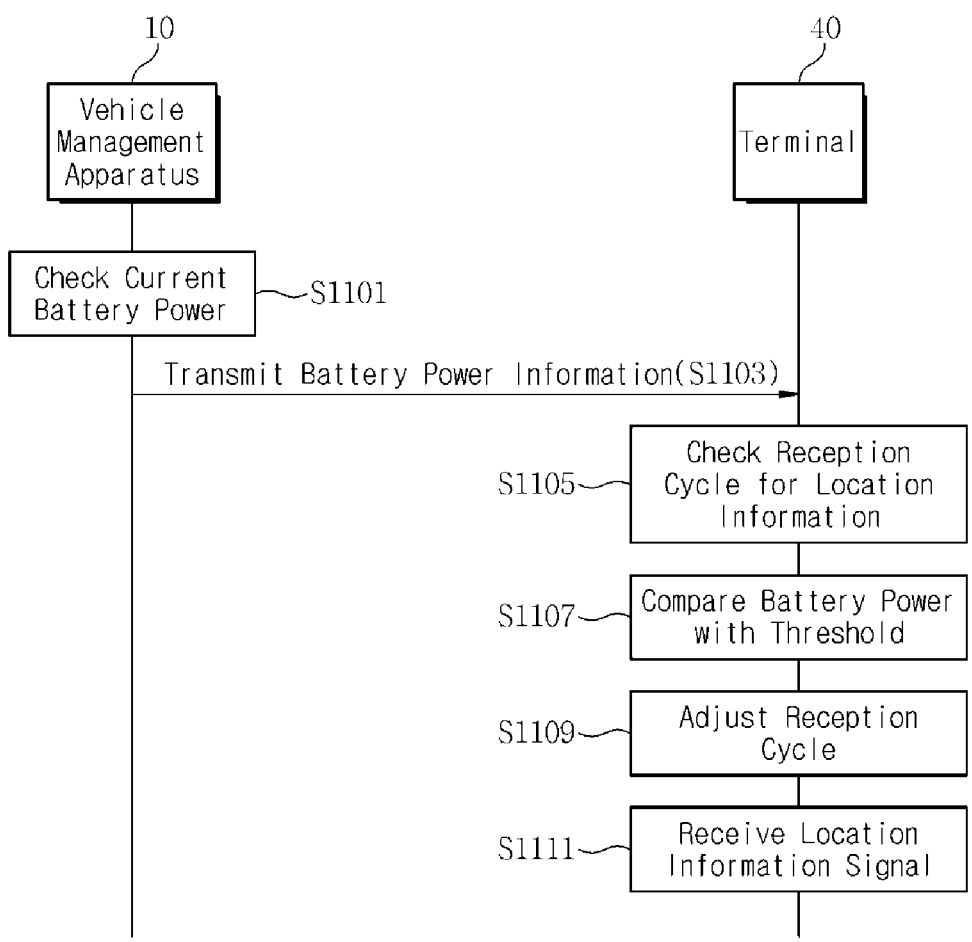
FIG. 15 is a flow diagram illustrating a method for controlling reception of a location information signal in consideration for the current battery power at a terminal in accordance with the third embodiment of the present invention.

FIG. 15 is a flow diagram illustrating a method for controlling reception of a location information signal in consideration for the current battery power at a terminal in accordance with the third embodiment of the present invention.

Referring to FIG. 15, the vehicle management apparatus 10 checks the current battery power at step S1101, and transmits the current battery power information to the terminal 40 at step S1103. Then the terminal 40 checks the predetermined number of times to receive location information signals at step S1105, and compares the current battery power with a predetermined threshold at step S1107. Thereafter, as discussed previously at steps S905 and S907 in FIG. 15, the terminal 40 adjusts at step S1109 the number of times on the basis of comparison results. Additionally, at step S1111, the terminal 40 receives location information signals according to the adjusted number of times.

Figure 16:
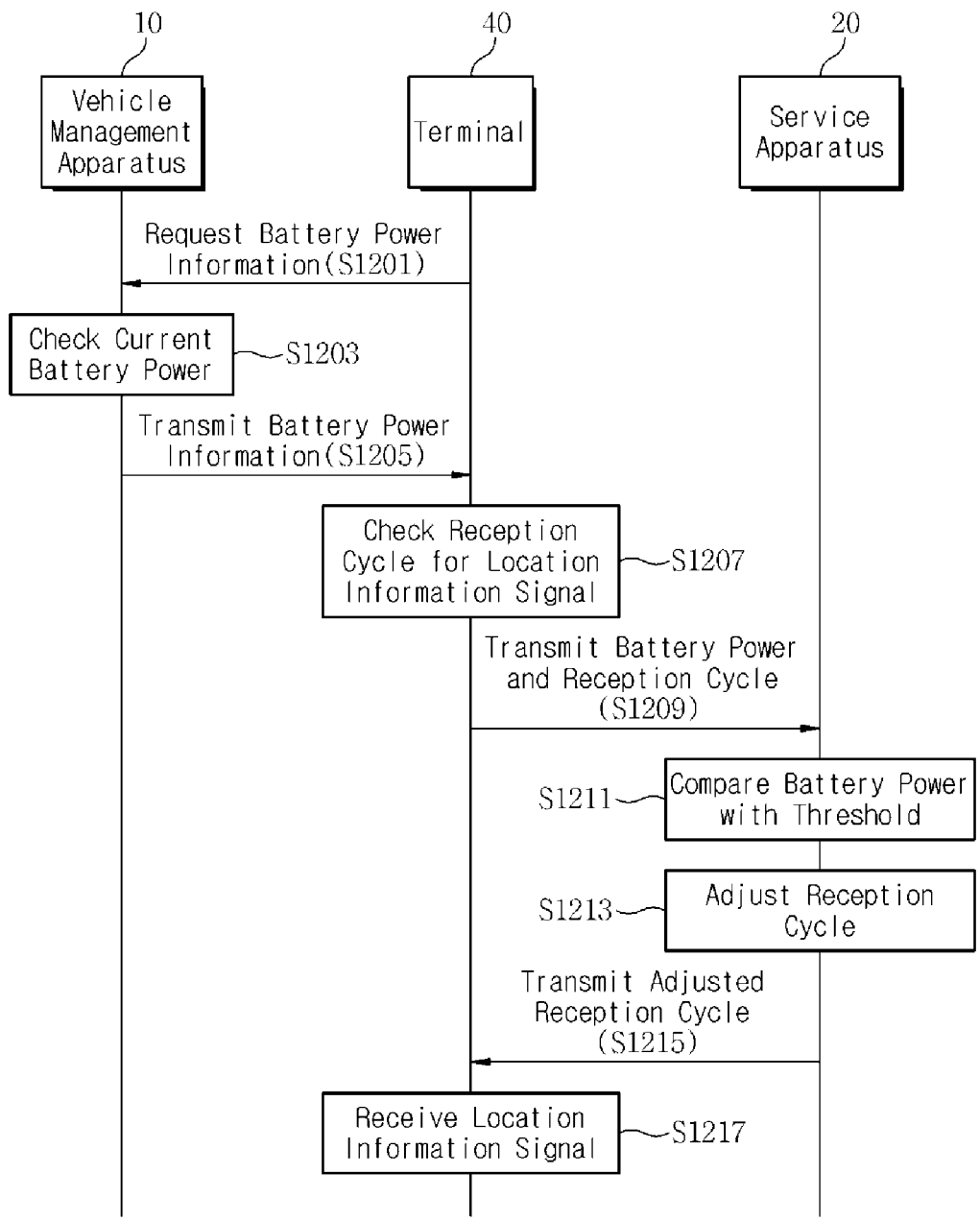
FIG. 16 is a flow diagram illustrating a method for controlling reception of a location information signal in consideration for the current battery power at a service apparatus in accordance with the third embodiment of the present invention.

FIG. 16 is a flow diagram illustrating a method for controlling reception of a location information signal in consideration for the current battery power at a service apparatus in accordance with the third embodiment of the present invention.

Referring to FIG. 16, the terminal 40 requests, at step S1201, the vehicle management apparatus 10 to provide current battery power information. Then the vehicle management apparatus 10 checks the current battery power at step S1203, and transmits it to the terminal 40 at step S1205. The terminal 40 checks the predetermined number of times to receive location information signals at step S1207, and transmits the current battery power information and the number of times to the service apparatus 20 at step S1209.

Then the service apparatus 20 compares the current battery power with a predetermined threshold at step S1211, and based on comparison results, adjusts the number of times at step S1213.

Thereafter, the service apparatus 20 transmits the adjusted number of times to the terminal 40 at step S1215, and the terminal 40 receives location information signals according to the adjusted number of times at step S1217.

As discussed above with reference to FIGS. 15 and 16, if the terminal 40 is connected to the vehicle management apparatus 10, namely if the terminal 40 uses electric power stored in a vehicle battery, it is desirable to adjust the number of times to receive location information signals so as to reduce power consumption.

Now, a method for controlling reception of a location information signal in consideration for the current battery power will be described in detail.

Figure 17A:
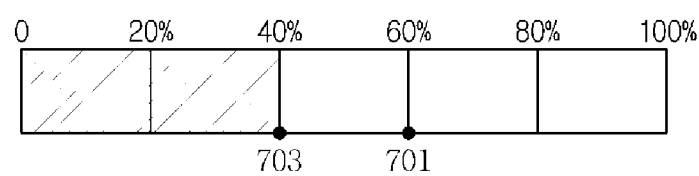
FIGS. 17A and 17B are views illustrating a method for controlling reception of a location information signal in consideration for the current battery power in accordance with the third embodiment of the present invention.
Figure 17B:
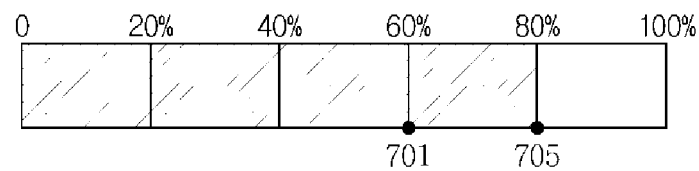

FIGS. 17A and 17B are views illustrating a method for controlling reception of a location information signal in consideration for the current battery power in accordance with the third embodiment of the present invention.

The terminal 40 checks the current battery power received from the vehicle management apparatus 10, and adjusts the number of times to receive location information signals by comparing the current battery power with a predetermined threshold.

As shown in FIG. 17A, if the current battery power 703 is lower than the predetermined threshold 701, the terminal 40 decreases the number of times so as to keep the battery power. For example, the terminal 40 that has received location information signals at intervals of ten times per minute receives them at decreased intervals of five times per minute.

In contrast, if the current battery power 705 is greater than the predetermined threshold 701 as shown in FIG. 17B, the terminal 40 maintains or increases the number of times to receive location information signals. For example, the terminal 40 that has received location information signals at intervals of five times per minute receives them at the same intervals or at increased intervals of ten times per minute.

Hereinbefore, the vehicle energy management methods have been described through embodiments of this invention.

Although the above embodiments are focused on a vehicle, this is exemplary only and not to be considered as a limitation of this invention. Alternatively, the methods described herein may also be applied to all kinds of transportations, such as aircraft and seacraft, which use electric energy as power source.

The vehicle energy management methods in embodiments of this invention may be implemented as program commands that can be executed by various computer means and written to a computer-readable recording medium. The computer-readable recording medium may include a program command, a data file, a data structure, etc. alone or in combination. The program commands written to the medium are designed or configured especially for the disclosure, or known to those skilled in computer software. Examples of the computer-readable recording medium include magnetic media such as a hard disk, a floppy disk, and a magnetic tape, optical media such as a CD-ROM and a DVD, magneto-optical media such as a floptical disk, and a hardware device configured especially to store and execute a program command, such as a ROM, a RAM, and a flash memory.

The computer-readable recording medium can be distributed over a plurality of computer systems connected to a network so that processor-readable code is written thereto and executed therefrom in a decentralized manner. Programs, code, and code segments to realize the embodiments herein can be construed by one of ordinary skill in the art.

While this invention has been particularly shown and described with reference to an exemplary embodiment thereof, it will be understood by those skilled in the art that various changes in form and details may be made therein without departing from the subject matter of the invention. Specific terms used in this disclosure and drawings are used for illustrative purposes and not to be considered as a limitation of the present invention.

INDUSTRIAL APPLICABILITY

The present invention relates to vehicle energy management technology and, more particularly, to a vehicle energy management system, method and apparatus for calculating electric power required for vehicle operation, selling surplus electric power that corresponds to current battery power minus the calculated electric power, or adjusting the number of times to receive location information signals according to the current battery power.

This invention has advantages of effectively utilizing electric power required for vehicles, of offering improved profitability and efficiency in electric power usage to both vehicle users and vehicle energy management service providers, and of contributing to the advancement of electric vehicle industry.

What is claimed is:

1. A vehicle energy management system comprising:
a vehicle management apparatus configured to calculate electric power required for vehicle operation, to transmit an electric power transaction request to a service apparatus, the electric power transaction request including information about surplus electric power that corresponds to current battery power minus the electric power required for vehicle operation, and if electric power transaction information is received from the service apparatus, to sell the surplus electric power according to the electric power transaction information; and
the service apparatus configured to monitor information about power rates and power demand, if the electric power transaction request is received from the vehicle management apparatus, to create the electric power transaction information for selling the surplus electric power on optimal condition in view of the information about power rates and power demand, and to transmit the electric power transaction information to the vehicle management apparatus,
wherein the electric power required for vehicle operation is calculated on the basis of at least one of vehicle operation pattern and weather information.

2. A vehicle energy management system comprising:
a vehicle management apparatus configured to monitor a state of a vehicle, to create current battery power information by checking current battery power, and to provide the current battery power information to a terminal;
the terminal configured to calculate electric power required for vehicle operation, to transmit an electric power transaction request to a service apparatus, the electric power transaction request including information about surplus electric power that corresponds to current battery power minus the electric power required for vehicle operation, and if electric power transaction information is received from the service apparatus, to transmit a control command to the vehicle management apparatus to sell the surplus electric power according to the electric power transaction information; and
the service apparatus configured to monitor information about power rates and power demand, if the electric power transaction request is received from the terminal, to create the electric power transaction information for selling the surplus electric power on optimal condition in view of the information about power rates and power demand, and to transmit the electric power transaction information to the terminal,
wherein the electric power required for vehicle operation is calculated on the basis of at least one of vehicle operation pattern and weather information, wherein the vehicle operation pattern is obtained using vehicle operation data received from the vehicle management apparatus, and wherein the weather information is received from the service apparatus.

3. A vehicle management apparatus comprising:
a communication unit configured to transmit an electric power transaction request to a service apparatus, and to receive electric power transaction information from the service apparatus; and
a control unit configured to calculate electric power required for vehicle operation, to transmit the electric power transaction request to the service apparatus, the electric power transaction request including information about surplus electric power that corresponds to current battery power minus the electric power required for vehicle operation, and if the electric power transaction information is received from the service apparatus, to sell the surplus electric power according to the electric power transaction information,
wherein the electric power required for vehicle operation is calculated on the basis of at least one of vehicle operation pattern and weather information.

4. The vehicle management apparatus of claim 3, wherein the control unit is further configured to, if the current battery power is insufficient for vehicle operation, calculate a shortage of electric power, to transmit an electric power transaction request including information about the shortage of electric power to the service apparatus, and if the electric power transaction information is received from the service apparatus, to purchases the shortage of electric power according to the electric power transaction information.

5. The vehicle management apparatus of claim 3, wherein the control unit is further configured to, if electric power transaction information that includes a time point of sales for selling the surplus electric power on optimal condition and location information about a place available for sales is received from the service apparatus, to output at least one of a transit path, a departure time and a transit time.

6. A vehicle energy management method comprising steps of:
at a vehicle management apparatus, checking current battery power;
at the vehicle management apparatus, comparing the current battery power with electric power required for vehicle operation;
at the vehicle management apparatus, if the current battery power exceeds the required electric power, calculating surplus electric power and thereby creating surplus electric power information, or if the current battery power is less than the required electric power, calculating a shortage of electric power and thereby creating electric power shortage information; and
at the vehicle management apparatus, if electric power transaction information is received from a service apparatus after transmitting, to the service apparatus, an electric power transaction request including the surplus electric power information or the electric power shortage information, selling the surplus electric power or purchasing the shortage of electric power.

7. The method of claim 6, further comprising steps of:
before the step of comparing,
at the vehicle management apparatus, creating operation pattern of a vehicle on the basis of vehicle operation data in given periods; and
at the vehicle management apparatus, calculating electric power required for vehicle operation on the basis of the operation pattern.

8. The method of claim 6, further comprising steps of:
before the step of comparing,
at the vehicle management apparatus, receiving weather information from the service apparatus; and at the vehicle management apparatus, calculating electric power required for vehicle operation on the basis of the weather information.

9. The method of claim 6, wherein the electric power transaction information includes a time point of sales for selling the surplus electric power on optimal condition or a time point of purchase for buying the shortage of electric power at the minimum price, and location information about a place available for sales or purchase.

10. A vehicle energy management method comprising steps of:
- at a service apparatus, monitoring information about power rates and power demand;
- at the service apparatus, receiving an electric power transaction request from a vehicle management apparatus or a terminal; and
- at the service apparatus, creating, in view of the information about power rates and power demand, electric power transaction information for selling surplus electric power on optimal condition or for purchasing a shortage of electric power at the lowest price, and then transmitting the electric power transaction information to the vehicle management apparatus or the terminal.

11. The method of claim 10, further comprising steps of: after the step of transmitting,
- at the service apparatus, if a notice of electric power transaction completion is received from the vehicle management apparatus or the terminal, determining accounting data by calculating electric power transaction volume of the vehicle management apparatus or the terminal; and
- at the service apparatus, based on the accounting data, paying a sale value to a user, requesting a purchase value from the user, or accumulating the sale or purchase value.

12. The method of claim 10, further comprising step of:
- at the service apparatus, if a power supply request is received from the vehicle management apparatus or the terminal, delivering the received power supply request to other vehicle management apparatus or other terminal.

* * * * *